(12) United States Patent
Vermes-Gabos

(10) Patent No.: US 11,845,525 B2
(45) Date of Patent: Dec. 19, 2023

(54) MARINE POWER PLANT ASSEMBLY

(71) Applicant: Andras Vermes-Gabos, London (GB)

(72) Inventor: Andras Vermes-Gabos, London (GB)

(*) Notice: Subject to any disclaimer, the term of this patent is extended or adjusted under 35 U.S.C. 154(b) by 0 days.

(21) Appl. No.: 18/006,172

(22) PCT Filed: Jul. 27, 2021

(86) PCT No.: PCT/EP2021/071066
§ 371 (c)(1),
(2) Date: Jan. 20, 2023

(87) PCT Pub. No.: WO2022/023377
PCT Pub. Date: Feb. 3, 2022

(65) Prior Publication Data
US 2023/0227138 A1    Jul. 20, 2023

(30) Foreign Application Priority Data

Jul. 28, 2020 (GB) .................................... 2011650

(51) Int. Cl.
*B63H 5/125* (2006.01)

(52) U.S. Cl.
CPC ................................. *B63H 5/125* (2013.01)

(58) Field of Classification Search
CPC .................................. B63H 5/125; B63H 5/00
See application file for complete search history.

(56) References Cited

U.S. PATENT DOCUMENTS

2010/0176595 A1* 7/2010 Bear .................... F03B 17/061
290/53
2017/0016125 A1 1/2017 Leonard

FOREIGN PATENT DOCUMENTS

| GB | 2252367 A | 8/1992 |
| GB | 2587316 A | 3/2021 |
| JP | 2000240555 A | 9/2000 |
| KR | 1020180106584 A | 10/2018 |
| WO | 2010006431 A1 | 1/2010 |

OTHER PUBLICATIONS

ISR and Written Opinion for PCT/EP2021/071066 (dated Oct. 26, 2021) (10 pages).
Examination Report for GB110790.9 (dated Dec. 23, 2021) (6 pages).

* cited by examiner

*Primary Examiner* — Stephen P Avila

(57) ABSTRACT

A marine plant assembly comprising a floating vessel and a plant operating unit attached to a buoyancy vessel in such a way that the operating unit is at least partially submerged during operation. At least one link element provides a hinged connection between the operating unit and the buoyancy vessel, thereby to allow movement of the operating unit from its submerged operating position to above the water level and adjacent the buoyancy vessel by said link element rotating into a position substantially parallel to the buoyancy vessel.

9 Claims, 21 Drawing Sheets

MARINE POWER PLANT ASSEMBLY

FIELD OF INVENTION

The present invention relates to a marine power plant assembly. More especially, the invention relates to such an assembly having means to lift the plant out of the water, for example for servicing and/or transport.

BACKGROUND TO THE INVENTION

The use of marine power plants on floating vessels to provide underwater operations are well known. Generally, the power plant is located under the water level during operation. It must be lifted out of the water for servicing, transportation and berthing.

Underwater operations include for example and without limitation, underwater surveying, measurement, excavations and dredging.

Furthermore, energy through tidal power may be generated by attaching underwater turbines to floating vessels.

The interest and demand in generating energy from renewable sources is increasing. One renewable source of energy is the tidal movement of large bodies of water generating regular, predictable flows. Economies and practicalities point to submerged turbines as a promising way of extracting energy from the moving water in cost effective manner.

One way of constructing underwater power plant is to attach turbines to floating vessels via movable links to keep the turbines underwater at specified depth and position to utilise the flows and to allow lifting the turbines out of the water for servicing, transport and berthing.

The prior art includes a number of floating assemblies used for generating energy through tidal power.

WO2015/090414 discloses one such complex floating apparatus.

EP1467091 describes an arrangement with turbines attached to floating vessel via links hinged at their connection to the vessel and midway between turbine and vessel. All hinges have horizontal axes parallel to the longitudinal axis of the main floating vessel.

Rotation around the vessel-side hinge allows the lowering and raising of the turbines while relative rotation around the mid-link hinge allows the turbines being moved close to the body of the vessel at or just above the water level.

This system allows the reduction of draft to that of the vessel but the beam is still governed by the length of turbine blades. The overall stability of the plant in the service position with turbines lifted out of the water is ensured by using buoyancy members attached to the main body of the vessel. The design, construction and operation of the hinges is complex.

WO2018/115806 describes a similar apparatus. Rather than use buoyancy members attached to the main body of the vessel, one central hull is used to make up the floating vessel which keeps the turbines on the water surface semi submerged in their raised position. An optional second hinge system near the hull vertical axis is disclosed which enables rotation of the link element into a position close to and parallel with the floating vessel, semi submerged. This vertical hinge would replace the mid link horizontal axis hinge. The overall stability of the apparatus is provided by keeping the nacelles partially submerged even in the raised position.

This solution reduces the draft of the assembly to about the same as the draft of the floating vessel and the beam to a width governed by the size of the nacelle and the width of the link element rather than the length of the turbine blades, the overall beam being less than that of the assembly described in EP1467091.

The apparatus described in WO2018/115806 comprises several hinges, hydraulics, ropes, floodable buoyancy chambers, electronic sensors and control units which greatly increase the structural, mechanical and electronic complexity of the solution and still provides only limited reduction of beam, leaves nacelles semi submerged and the turbine blades and nacelle are exposed to potential impact damage as they constitute the widest part of the arrangement.

Both EP1467091 and WO2018/115806 imply positioning the full power generation system including shafts, gear box/transmission and electricity generator in the nacelle. This increases the size and weight of the nacelle with the consequential larger stream forces acting on nacelle, linking element and hinges, requiring more robust and powerful moving mechanisms and concerns of overall stability when nacelles are lifted out of the water.

Some of the aims in developing the above solutions is to eliminate the need for special sea vessels for installation and maintenance; to reduce the draft and beam of the floating apparatus in berthing or towing and to raise the nacelle out of the water as much as possible for ease of on-site service and transportation.

The Applicant believes there remains the need for a simpler and safer apparatus and system to achieve the above goals.

The present invention seeks to provide such a system which allows movement of the operating unit (underwater plant) from specified position underwater (its operating position) to another specified point above water, next to body of the host vessel (a service position) by adopting an inclined hinge around which the link element holding the operating unit rotates. This results in the operating unit travelling in an inclined plane from one position to the other. The exact location and inclination of the hinge axis and the length of the link element are designed to place the operating unit into the desired positions.

The present invention also seeks to provide an improved assembly whose layout and construction of the hinge is in two parts both aligned on the same axis, one attached directly to the main vessel—internal side, the other via a hinge support structure—external side.

The present invention also seeks to provide an improved assembly that utilises props to stabilise the link element and operating plant in the operating position.

The present invention also seeks to provide an improved assembly that has a link element formed in two parts (upper and lower) having a common longitudinal axis and allowing rotation of the lower part around the longitudinal axis.

The present invention also seeks to provide an improved assembly that includes a movable/extendable access deck installed in a manner to avoid the path of the link element and operational unit and serving as protection to the nacelles while towing or berthing takes place.

STATEMENTS OF INVENTION

In according to a first aspect of the invention there is provided, a marine plant assembly comprising: a floating vessel; a plant operating unit attached to a buoyancy vessel in such a way that the operating unit is at least partially submerged during operation; at least one link element providing a hinged connection between the operating unit and the buoyancy vessel, thereby to allow movement of the operating unit from its submerged operating position to above the water level and adjacent the buoyancy vessel by said link element rotating into a position substantially parallel to the buoyancy vessel.

Preferably, the hinge includes two pairs of cylindrical bearings aligned on a common axis and being able to rotate relative to one another about the common axis, a first cylindrical bearing of each pair being attached secured to a connection plate which in turn is secured to the link member, and the second of each pair being indirectly secured to the buoyancy vessel.

Preferably, the second bearing of one pair is secured to a mounting plate which in turn is secured to the buoyancy vessel and the second bearing of the other pair is secured to a support structure which in turn is secured to the buoyancy vessel.

Preferably, each pair of cylindrical bearings has a first central shaft extending therethrough, the shaft having a rotation transmitting device secured thereto to rotate the shaft about the common axis independent of the bearings.

Preferably, the rotation transmitting device comprises a first bevel gear. Preferably, the link element further includes a second rotatable shaft extending to the operating unit and having a second bevelled gear engaging, in use with the first bevelled gear such that rotational force generated by the operating unit is transmitted through the second shaft to the first shaft via engagement of first and second bevelled gears and thereon to the buoyancy vessel for utilisation.

Alternatively, the rotation transmitting device comprises a sprocket. Preferably, the rotational force generated by the operating unit is transmitted through a chain located within and through the link element to the sprocket and thereon to the buoyancy vessel for utilisation.

Preferably, the link element is secured and retained in position by props attached to the link element and the buoyancy vessel. Preferably, the props are attached via a hinge to the link element and are detachable from the buoyancy vessel so to allow the props to be positioned against the link element to allow rotation of the link element around the hinge. Preferably, the props are detachable from the link element.

Preferably, movement of the link element is controllable using ropes attached to winches mounted on the buoyancy vessel.

The link element may include a first hinged arm comprising in first and second joined sections, the sections being aligned along same axis, the distal end of the first section being connected to an internal part of the floating platform and the distal end of the second section being connected to a second hinged external part of the floating platform.

Preferably, the operating unit is secured to the distal end of the second hinged arm. Preferably the assembly further comprising one or more props connected to the hinged arms to support and stabilise the plant operating unit when in its operating position.

Preferably the first and second sections of the first hinged arm extend along a common longitudinal axis and the linking element includes means to allow rotation of the first section relative to the second section thereby to cause rotation of the second hinged arm to move the operating unit to its second position.

Preferably the floating vessel includes a movable or extendible platform in a location that does not obstruct movement of the linking element of operating unit.

Preferably the operating unit is a turbine.

According to a further aspect of the invention, there is provided, an apparatus and system for moving a marine plant in and out of water by means of it being attached to one end of link member in a manner allowing rotation around the longitudinal axis of said link member which at its other end is being attached to main body of host vessel floating on water by means of multiple hinge and bearing elements arranged to allow rotation around an inclined axis resulting in said link member moving in an inclined plane from a diagonal position extending downwards and away from host vessel—operating position—to a position parallel or near parallel with main body of said host vessel and above water—service position; whereby said link element is being secured in the operating position by props pivotally attached to said link element and attached to main body of host vessel with releasable connections at their other end thus forming a triangulated frame with said link member capable of resisting forces acting on operating unit, link element and props.

Preferably, hinges are formed by pairs of cylinders fitting into one another with flanges at their opposite ends, one flange attached to mounting plates structurally connected directly to body of host vessel or to support structure attached to host vessel while flange of the matching cylinder being attached to connection plate forming part of link element, two sets constructed as above set apart by adequate distance aligned on same axis enabling link element to rotate around said axis.

Preferably, said hinges and bearings are formed cylindrically and apart allowing installation of shaft through their opening in such manner so that said shaft and said link element are capable of independently rotating around same axis with sufficient space provided between said hinges and bearings so as to allow the fitting of shaft and bevel gear wheel onto longitudinal axis of said link element in a manner the gear wheel engaging with gear wheel fitted onto shaft going through the opening of said hinges and bearings.

Preferably, releasable connection of prop end to body of host vessel is accomplished by connection plates with slotted holes being permanently attached to said prop ends in a manner such they engage with pins attached to said host vessel and enable the connection to transmit forces acting longitudinally along the axes of said props while said connection plates are being held in place by locking rods threaded through brackets attached to host vessel.

Preferably, the releasable connection of prop end to host vessel is accomplished by at least one connection plate permanently attached to body of host vessel with shear pins being attached to said connection plate oriented in a manner allowing slotted holes of the prop end connection plate engaging with the shear pins installed on connection plate attached to body of host vessel, said assembly being held together by locking devices engaging with top of said connection plate attached prop end formed in a manner allowing connection and preventing separation of connection plates from the shear pins, thereby enabling the transfer of longitudinal forces from prop end to body of host vessel.

Preferably, said link element is moved and controlled by ropes attached to winches mounted on the main body of the host vessel or onto support structures connected thereto.

Preferably, said props are moved by ropes controlled by winch attached to the link element and by rope led via guide rollers to winch attached to deck of host vessel.

Preferably, said link element and props are secured by connection plates attached to each being secured by pins or bolts to hold props in fixed position relative to link elements while link element is being moved from one position to another.

Preferably, said link element is being held in its service position by connection plates attached to link element and link support structure attached to main body of host vessel being secured by pins or bolts or other suitable devices to hold link elements and attached props and operating plant securely in the service position.

BRIEF DESCRIPTION OF THE DRAWINGS

At least one embodiment will now be described by way of example only with reference to the accompanying figures in which:

FIG. 6d shows the locking detail of the embodiment of FIG. 6a;

FIG. 8b shows detailed views of the main hull-prop connection of FIG. 8a;

FIG. 8c shows a locking device of main hull-prop connection of FIG. 8a;

FIG. 9b shows a front view of the leg and nacelle of FIG. 9a;

FIG. 11b shows a side view of the general arrangement of a horizontal axis turbine of FIG. 11a;

FIG. 13c shows the schematic details of a leg and turbine of the vertical axis turbine of FIG. 13a.

DETAILED DESCRIPTION OF PREFERRED EMBODIMENTS

Figure 1A:
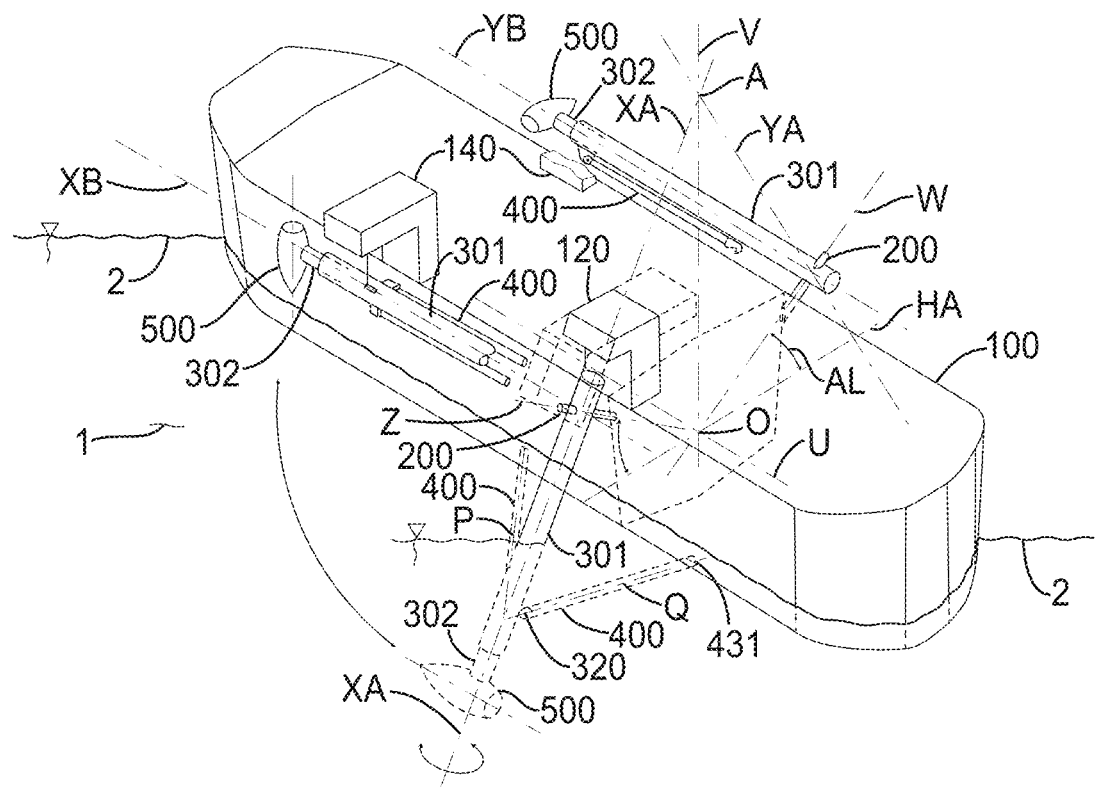
FIG. 1a is an axonometric view of a marine power plant assembly constructed in accordance with a first embodiment of the invention.

In the following description the link element will also be referred to as 'leg' and the host vessel as 'main body', 'floating vessel' or 'hull'.

Individual component descriptions, referring to reference numerals in the figures, are provided at the end of this description.

For the purposes of the description, the following letter references are provided to indicate various and specific axes.

U A specific longitudinal axis of the floating vessel.
V Vertical axis in the plane of the "legs", intersecting with "U", "W" and Z.
W Inclined axis of the main hinge in plane perpendicular to axis U.
Z Inclined axis of the main hinge—opposite side to "W".
ZC Inclined axis of the main hinge—opposite side to "W"—out of the normal plane
XA The axis of the leg in its operating position.
XB The axis of the leg in its service position.
YA The axis of the leg in its operating position—opposite to XA.
YB The axis of the leg in its service position—opposite to XB.
YAC The axis of the leg in its operating position—hinge axis WC out of the normal plane
YBC The axis of the leg in its service position—hinge axis WC out of the normal plane
P/Q Axes of props in operating position.
R/S Axes of props in operating position.
HA Horizontal line passing through the centre point "O".
HAC Horizontal line passing through the centre point "O"—out of the normal plane.

Moreover, reference letters for notable points and angles are provided below.

Point Description

O Centre of the geometry, intersection of the main axes "V", "U", "W" and Z.

A Intersection of the main vertical axis "V" and the two leg axes "XA" and "YA".
Pivot point for the leg, intersection of axis "Z" with "XA" and "XB".
C Pivot point for the opposite leg, intersection of axis "W" with "YA" and "YB".
CC Alternative position of point 'C', rotated around axis 'V' by angle BET
D Intersection of the hull with axis "V", top.
E Corner of the hull.
F Intersection of the hull with axis "Z".
G Corner of the hull.
H Intersection of the hull with axis "V", bottom.
I Corner of the hull.
J Intersection of the hull with axis "Z".
K Corner of the hull.
M Prop axis—Hull intersection point.
N Prop axis—Hull intersection point.
T Mid point between M and N.

Angle Description

AL Inclination of hinge axes W, Z and WC to horizontal.
BET The angle between HA and HAC, the angle of hinge axis WC to the normal plane defined by axes V, W and YA.
GAM The angle between the link/leg and props in elevation, The angle between line LB and LT FIG. 1a illustrates an axonometric view of example embodiment, showing the main components floating vessel 100, two part link element 301/302 propped against vessel 100 by props 400, main pins 200 and the operating unit/plant 500 attached to link 302; also in service position.

The figure shows the floating vessel 100 on the surface 2 of a body of water 1 with upper end of legs 301 attached via hinges 200. Operating unit 500 is attached to the lower end of leg 302 in the operating position XA/YA and in the service position XB/YB. Props 400 attached to legs 301 via hinges 320 connect to main body 100 in the operating position via releasable connection plates 431 and fold against legs 301 in the service position. The external/upper end of hinges 200 are supported by the hinge support structure 120. The leg support structure 140 holds and secures legs 301 in the service position XB/YB.

Figure 1B:
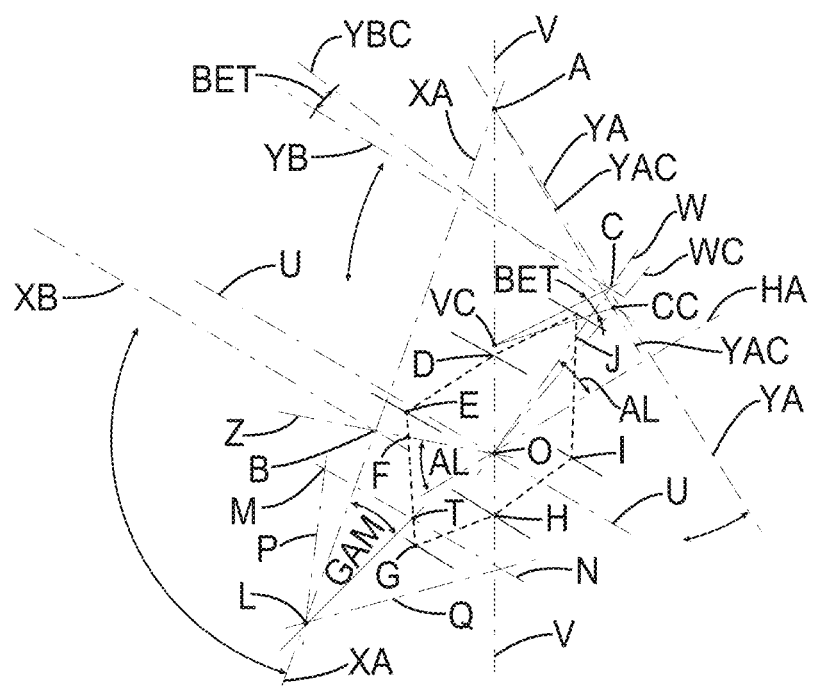
FIG. 1b is a schematic view of the concept behind the invention detailing points, lines and axes.

FIG. 1b illustrates an axonometric view of the notable points and axes. The primary points and axes being W and Z rotational axes, XA and YA link axes in operating position and XB and YB in service position.

It can be seen from FIG. 1b that the main longitudinal axis U of vessel 100 and the vertical axis V intersect at point O. The axes XA and YA of legs 301/302 in the operating position intersect vertical axis V in point A. Leg axes XA and YA rotate around hinge centre points B and C into the service position XB and YB.

Aligning axes W and Z in a plane normal (perpendicular) to the main longitudinal axis U results in axes XB/YB being parallel to axis U when they reach horizontal position. Axes W an Z can be slightly rotated around axis V whereby YA would move into position YAC, W into WC, point C into position CC and consequently axis YB into YBC at an angle to U, the further away from point CC the greater the distance between YBC and U.

Figure 2A:
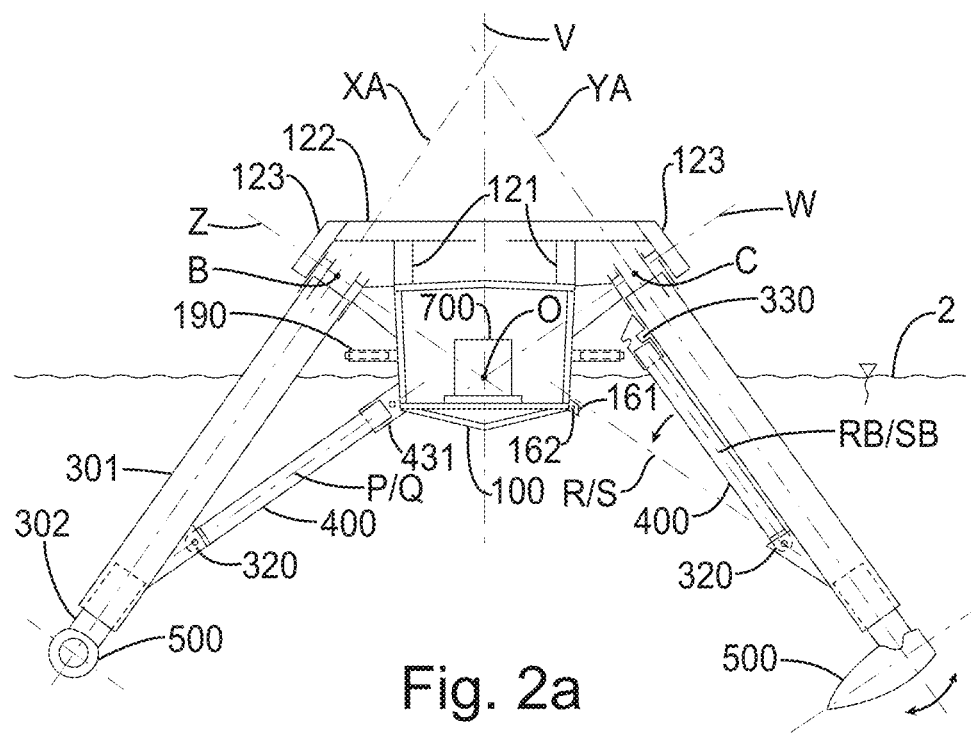
FIG. 2a is a sectional view of the assembly of FIG. 1.

FIG. 2a illustrates a typical cross section of the embodiment in operating position, showing main elements. This is a typical proposed cross section of the arrangement showing the top and lower part of legs 301/302 in operating position. Pin support structure legs 121 hold the top part 122 which in turn holds the external part/main hinge housing 123. An access platform 190 is positioned under the top part of leg 301. Lower part of the leg 302 connects to operational unit 500. Props 400 connect to legs 301 via hinge pins 320 and to main body 100 via connection plates 431 and connection pin 162 held by connection plate 161. Props 400 are secured to legs 301 through prop top connection plate 330 while props move between operating—P/Q and R/S—and service positions. The on-board plant 700 is located inside the main body 100. Intersection of main hinge axes W and Z is at point O.

Figure 2B:
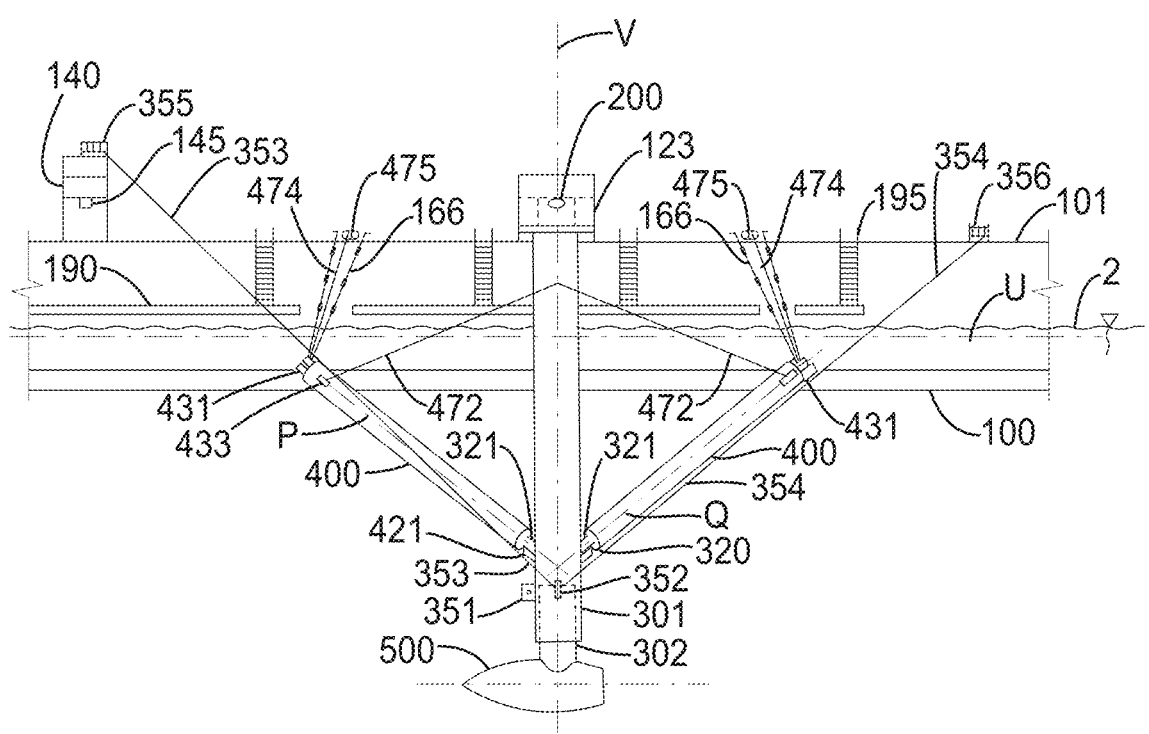
FIG. 2b is a side view of the assembly.

FIG. 2b illustrates a side view of the embodiment in operating position, showing main elements and ropes and winches for moving the links 301/302 and props 400 from one position to another.

Leg 301/302 held in operating position by props 400 connecting to leg 301 via connection plates 321 and 421 and pin 320. Top end of props 400 connect to hull 100 via connection plates 431 which is locked in place by locking rods 166. Top end of leg 301 held by main pin 200 supported by external part of pin support structure 123. Operating plant 500 is attached to lower end of leg 302. Leg 301 is moved by counter operation of leg moving ropes 353 and 354 connecting to leg 301 via rope connection plate 352 and winches 355 and 356 mounted on the leg support structure 140 and vessel deck 101. Props are moved to/from legs 301 by the leg side control ropes 472 connecting props 400 via connection plates 433, and the hull side control ropes 474 which are moved by the hull side prop control winches 475. Leg support structure 140 is positioned on the main body 100 such that it can secure legs 301/302 in the service position via connection plates 145 and 351. Platform 190 has discontinuities to allow locking rods 166 and hull side ropes 474 being laid out along the side face of main vessel 100. Access ladders 195 connect the floating vessel top deck 101 to access platforms 190.

Figure 2C:
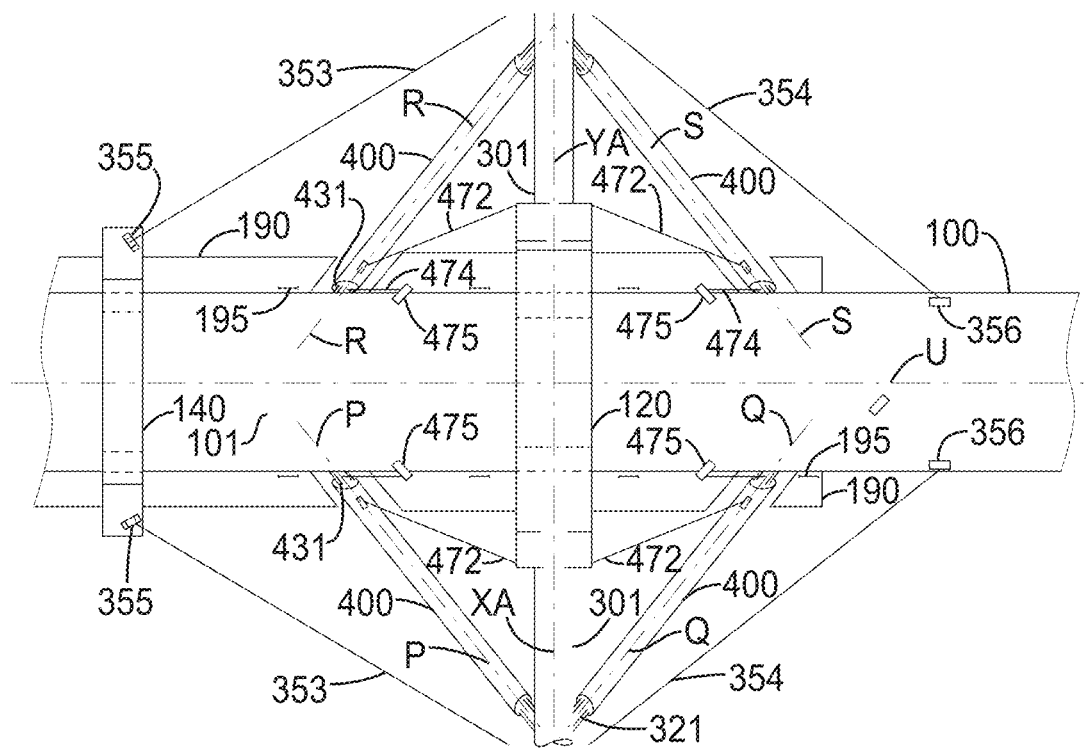
FIG. 2c is a plan view of the assembly.

FIG. 2c illustrates a top view (plan view) of the arrangement in operating position.

Figure 3A:
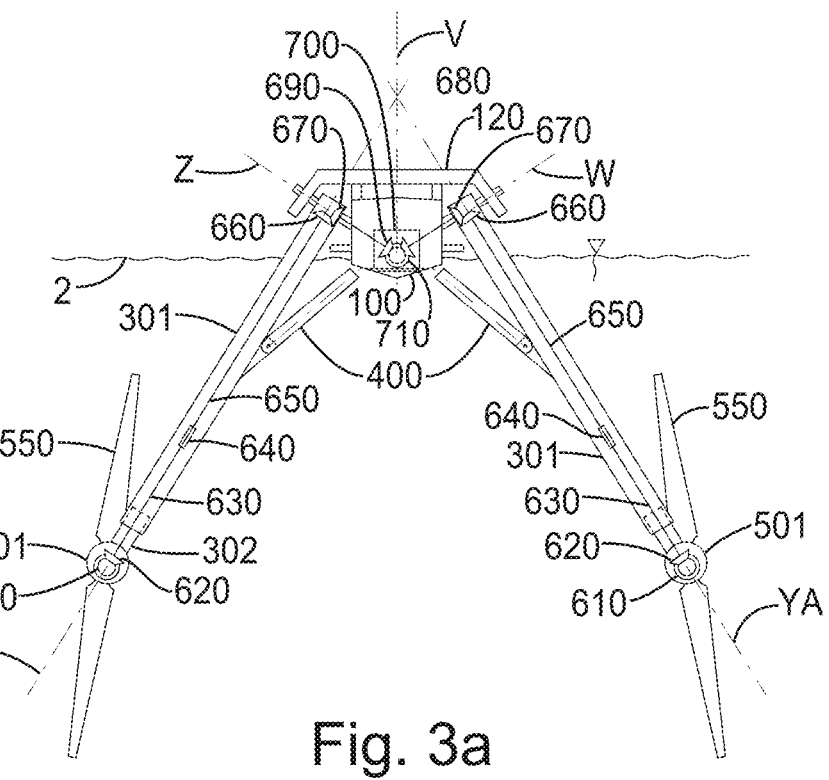
FIG. 3a shows section view of a potential utilisation of the assembly.

FIG. 3a illustrates a potential utilisation indicated by end view of arrangement showing mechanical gear-shaft drive train from turbine gear wheel 610 located in nacelle 501 to main axis gear wheel 710 of on-board plant 700.

Torque is transmitted from turbine blades 550 via the chain of turbine horizontal axis gear wheel 610, inclined axis gear wheel 620, lower end of drive shaft 630, drive shaft splice 640, upper end of drive shaft 650, inclined axis top end gear wheel 660, inward axis top end gear wheel 670, inward axis drive shaft 680 and inward axis lower gear wheel 690 connecting to main plant gear wheel 710.

Figure 4A:
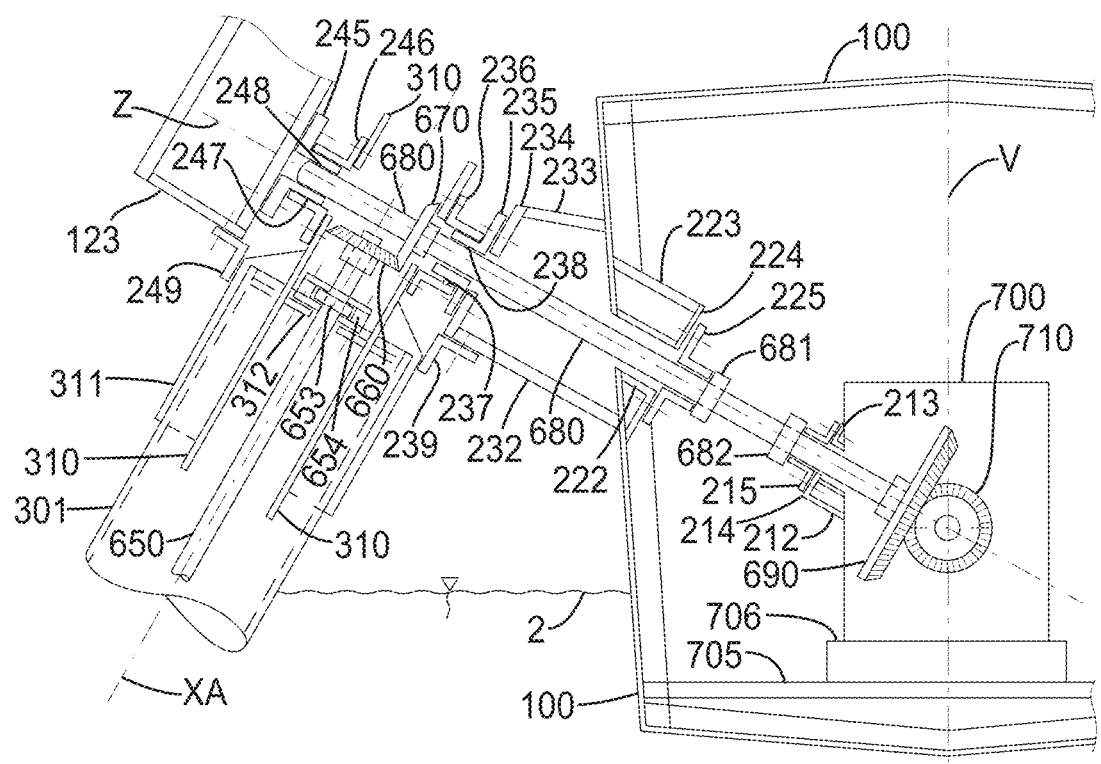
FIG. 4a shows the main hinge and gear drive train of an embodiment of the assembly in an operating position.

FIG. 4a illustrates one embodiment of the main hinge arrangement showing components of main hinge, attachment method and potential utilisation with gear-shaft drive train schematically. The main hinge is accomplished by cylindrical bearings with flanges, 235/236 on the hull side and 245/246 on the external side.

The essence of the hinges are cylindrical flanged bearings 235, 236, 245 and 246. Bearings 235 and 236 fit into one another, the mating face 237 allows smooth rotation along the axis Z. Bearings 245 and 256 are similar. Flanges are at the opposite ends, flanges of 246 and 236 connect to outer face of leg connection plates 310, flanges of 245 and 235 connect to pin support structure 123 and hull side mounting plate 234 respectively. Mounting plate 234 is attached to main hull 100 via connection plates 232 and 233. Guide angles 239 and 249, attached to connection plate 232 and pin support 123 extend in a circular fashion engaging with and supporting stiffener plates 311 as leg 301 rotates around axis Z. This arrangement allows the transfer of forces from leg 301 to the structure of the vessel 100.

Potential utilisation with gear-shaft drive train would have shaft 650 in leg 301 fitted with bevel gear 660. Shaft 650 would be held by thrust bearing 653 on mounting 654 attached to mounting plate 312. Internal faces 238 and 248 of bearings 235 and 245 are to be suitable to provide for continuous rotation of inclined shaft 680, driven by bevel gear 670 engaging with gear 660. Inclined shaft would be supported by bearings 215 and 225 attached to plates 214 and 224, connected to main on-board plant via plates 212 and 213 and to inside face of hull structure 100 via plates 222 and 223. Gear 690 at the inside end of shaft 680 drives main plant gear wheel 710.

Longitudinal forces on shaft 680 are transmitted to bearings 225 and 215 via thrust bearings 681 and 682 attached to shaft 680.

Figure 4B:
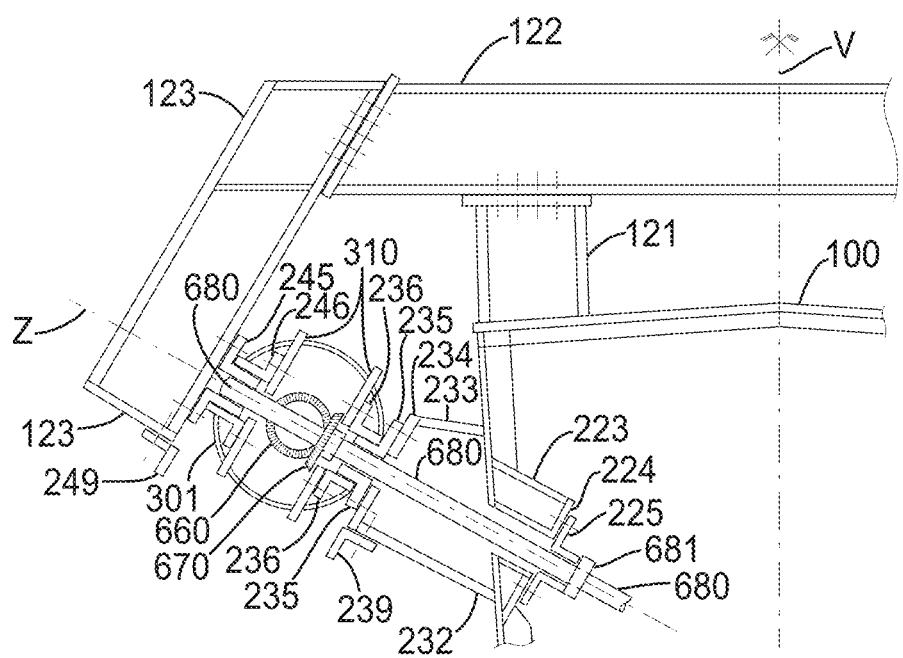
FIG. 4b shows the embodiment of FIG. 4a the assembly in a service position.

FIG. 4b illustrates the embodiment of the main hinge arrangement of FIG. 4a with link 301 in service position, showing potential utilisation with gear-shaft drive train between nacelle (501) and on-board plant (700).

Component parts of pin support structure (120), leg 121, top part 122 and external part 123 are shown in addition to parts described in FIG. 4a.

Figure 4C:
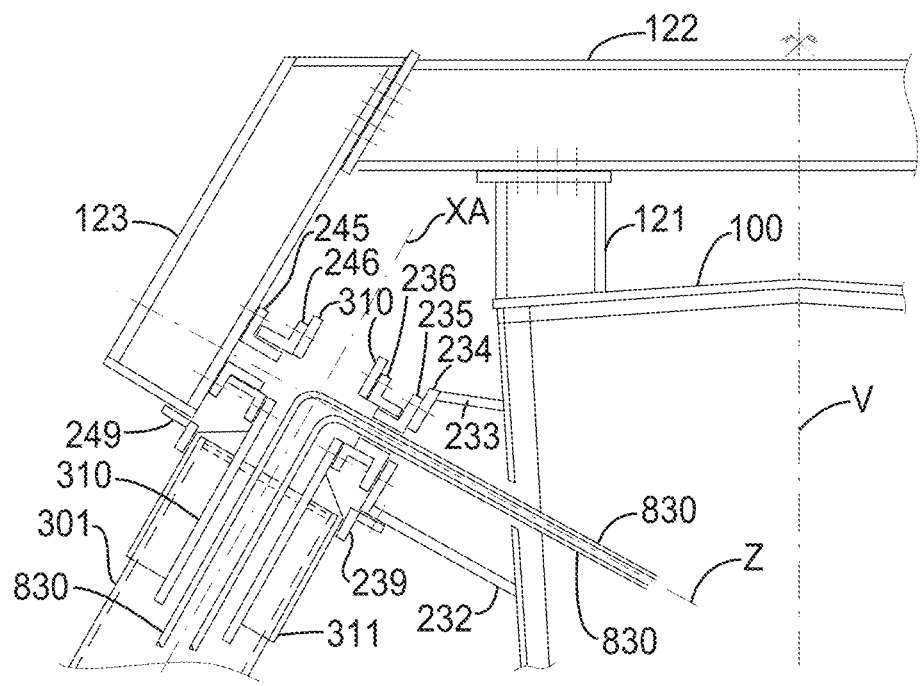
FIG. 4c shows the main hinge and hydraulic drive train of an embodiment of the assembly in an operating position.

FIG. 4c illustrates an embodiment of main hinge arrangement, leg 301 in operating position, showing potential utilisation with hydraulic drive train between nacelle (501) and on-board plant (700).

The opening through internal bearing 235 is utilised to carry in hydraulic pipes 830 serving power transfer between the nacelle (501) and the on-board power plant (700).

Figure 5A:
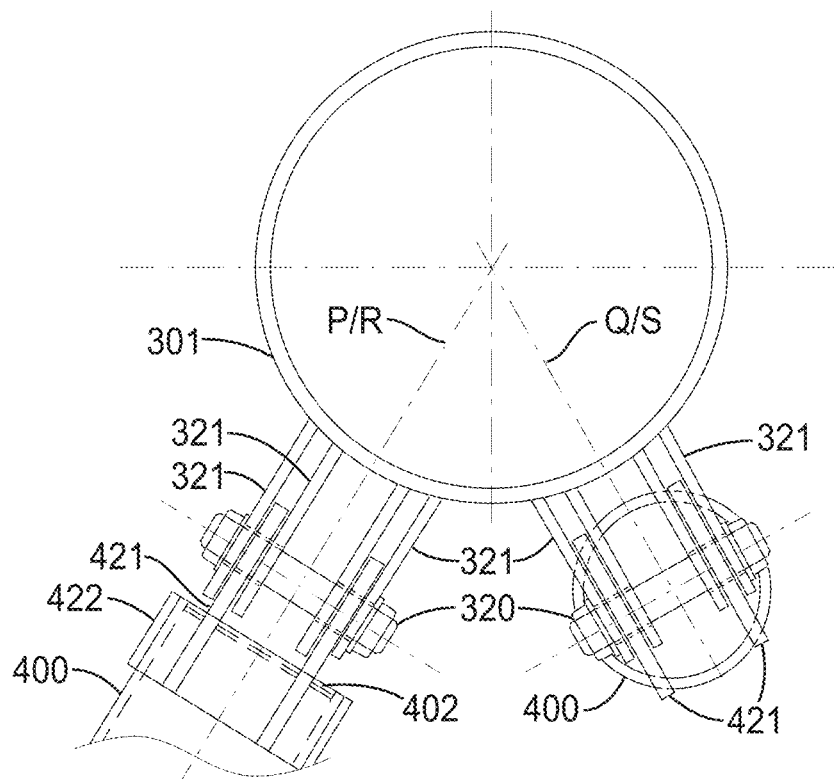
FIG. 5a shows the leg-prop base connection hinge of an embodiment of the assembly.

FIG. 5a illustrates an embodiment of leg-prop connection via hinge pin 320. Left side of section shows prop 400 in operating position, right side shows it in service position.

Leg connection plates 321 are attached to leg 301, prop side connection plates 421 to prop 400. Stiffener plates 422 strengthen the prop and end plate 402 closes the prop against water ingress. Props pivot around leg-prop pin 320 between service and operating positions.

Figure 6A:
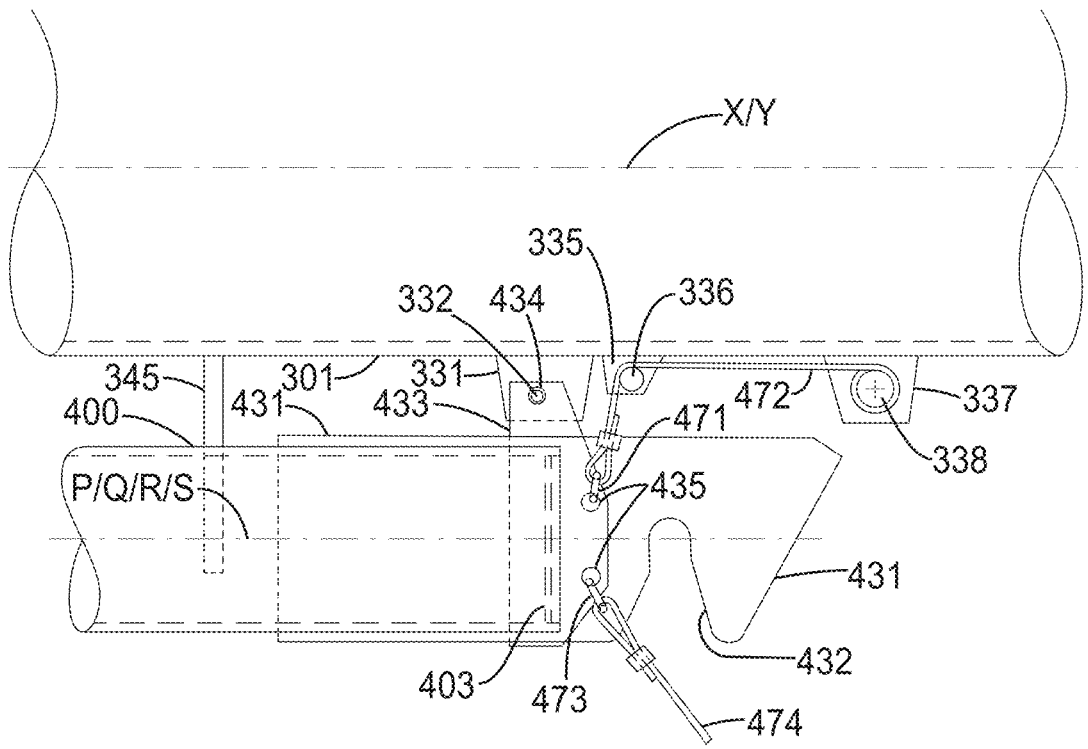
FIG. 6a shows a side view of the leg-top of prop connection in service position.

FIG. 6a illustrates an embodiment showing side view of the upper leg-prop connection in service position, prop 400 folded and secured against leg 301, with prop side leg connection plate 431 connected to leg side plate 331. Connection pin 332 attached to legs side connection plate 331 engages with prop side connection plate 433 via hole 434 and holds plates 331 and 433 together.

Leg side control rope 472 connecting to prop connection plate 433 with shackle 471 runs guided by rope roller 336 mounted on frame 335 to rope winch 338 held by frame 337. Guide 345 attached to leg 301 ensures prop 400 is in the correct position and connection plates 331 and 433 meet face to face.

Two main hull connection plates 431 with slots 332 are attached to top of prop 400. End plate 403 closes the prop against water ingress.

Hull side control rope 474 connecting via shackle 473 and hole 435 runs on side of main hull (100) to winch (475).

Figure 6B:
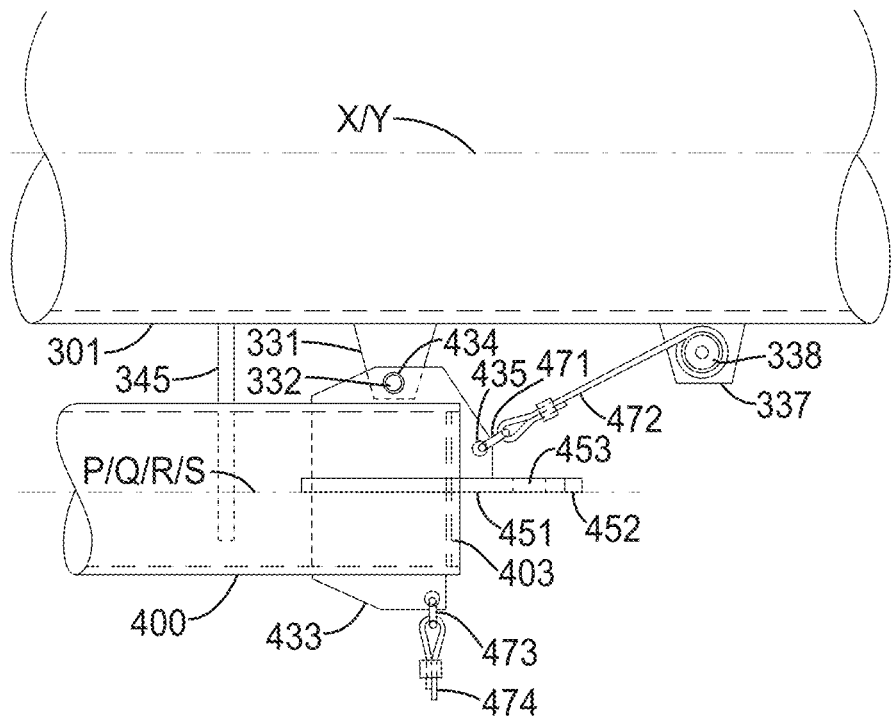
FIG. 6b shows a side view of a leg-prop base connection of an alternative embodiment of the assembly.

FIG. 6b shows the side view of the upper leg-prop connection in service position with alternative embodiment of prop-hull connection, connection plate 451 attached to prop 400 to connect to main hull (100).

In the alternative solution the two connection plates 431 are replaced by alternative connection plate 451, having guide nibs 452 and holes 453.

Figure 6C:
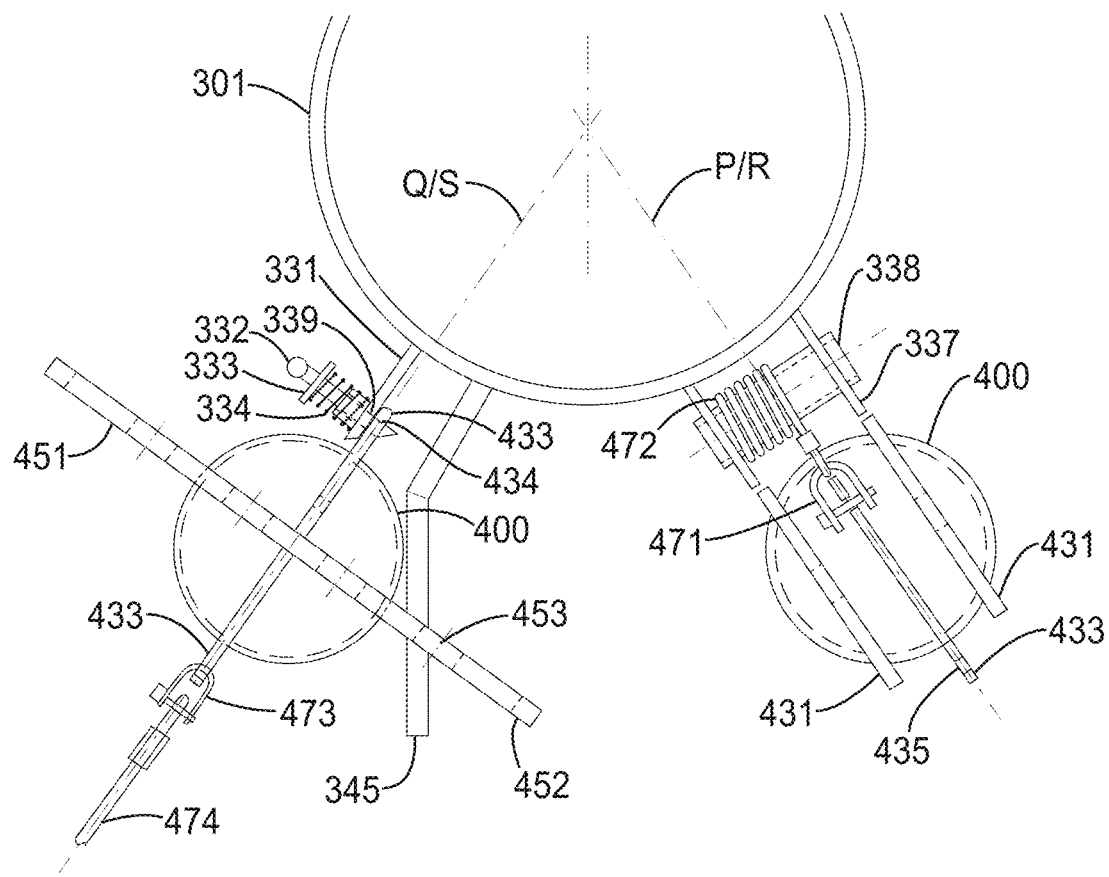
FIG. 6c shows an end view of the embodiment of FIGS. 6a and 6b.

FIG. 6c illustrates two embodiments with plates 431 and 451 of the prop-hull connection in end elevation of service position. The figure shows section of upper leg-prop connection in service position, alternative main hull connection on the left side.

Prop 400 is held in place by pin 332 going through holes 339 and 434 in plates 331 and 433 respectively. Pin 332 held in place by spring 334 connecting plate 333 attached to pin 332 to connection plate 331. Main hull connection plate 451 with guide nib 452 and shear pin holes 453 are shown. Top leg-prop connection is same for preferred connection layout, not shown.

Guide 345 ensures prop side connection plate 433 moves towards leg side plate 331 while being pulled up by control rope (472).

Right side shows a version of two prop-hull connection plates 431 being attached to prop 400, leg mounted upper rope winch 338 and its frame 337 with control rope 472 and shackle 471 attached to leg-prop connection plate 433.

Figure 6D:
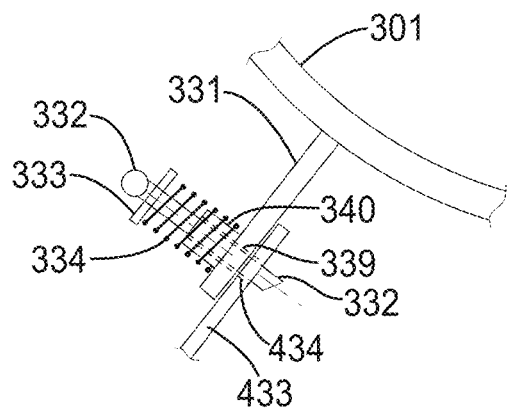

FIG. 6d illustrates in enlarged detail, the leg-prop connection locking mechanism with spring 334 and pin 332. Pin 332 is capable of sliding in hole 339 and socket 340 while being attached to spring 335 via push plate 333. Spring 334 is connected to plates 331 and 333 and holds pin 332 engaged with plates 331 and 433 preventing relative movement between the two but allows pin 332 being withdrawn to disengage from plate 433 thus allowing prop (400) to move away from leg 301.

Figure 6E:
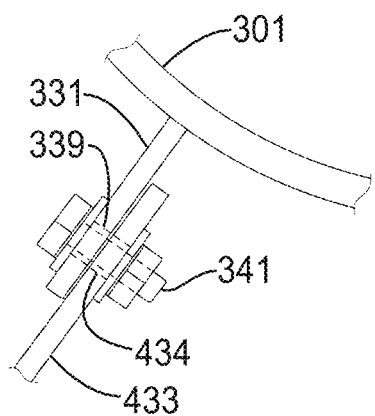
FIG. 6e shows the locking detail of an alternative embodiment of the assembly.

FIG. 6e illustrates, in enlarged detail of the leg-prop connection locking mechanism with bolt 341. Pin 332, push plate 333, socket 340 and spring 334 are being replaced by bolt 341.

Figure 7A:
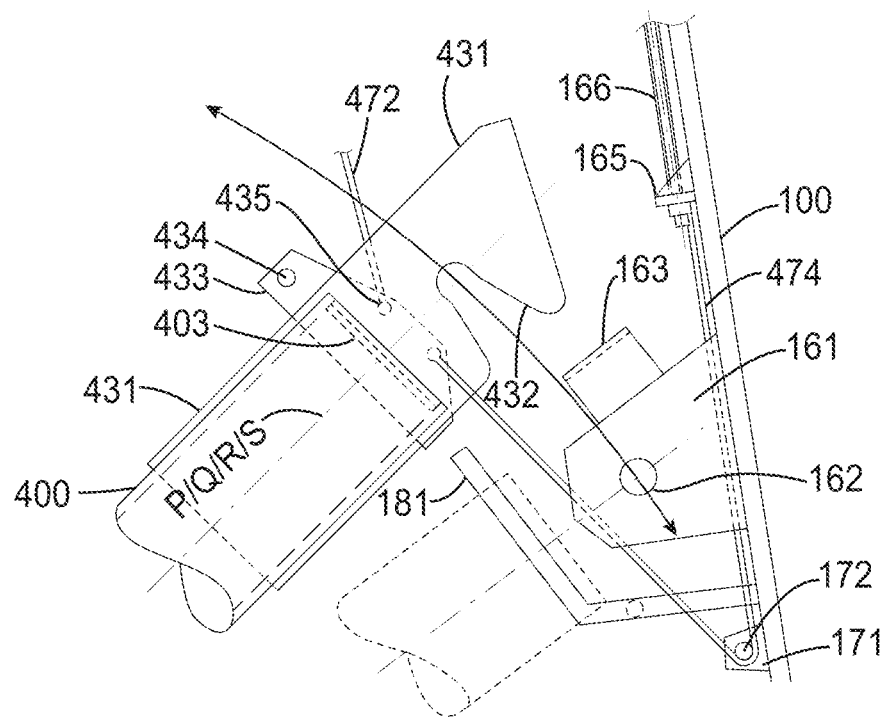
FIG. 7a shows a side view of the main hull-prop connection of an embodiment of the assembly in an intermediate position.

FIG. 7a shows a side view of embodiment of prop-main hull connection with prop 400 near operating position with main connection plate 431 and pin 162. Top end of prop 400 has end plate 403, two main connection plates 431 with slot 432 in each, rope and leg connection plate 433 with connection holes 434 and 435, control ropes 472 and 474 attached. Main connection plate 431 is parallel to the plane in which prop 400 moves while pivoting around leg-prop hinge (320). Hull side of connection composed of plates 161 holding main connection pin 162 and inclined guide plate 163, attached to main body 100. Locking rod 166 is threaded through bracket 165 shown in the service position. Bracket 165 has plate with threaded hole through which locking rod 166 can be threaded up and down to lock or unlock plate 431. Control rope 474 is lead through control rope roller 172 held by frame 171 attached to main body 100. Guide plate 163 and guide frame 181 ensure main connection plate 431 engages connection pin 162 in correct position.

Figure 7B:
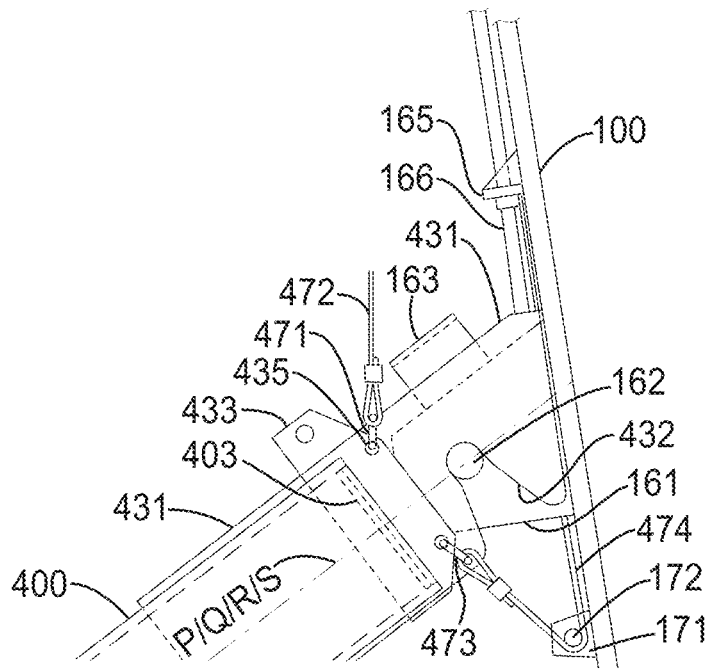
FIG. 7b shows a side view of the embodiment of FIG. 7a in an operating position.

FIG. 7b shows a side view of embodiment of prop-main hull connection with prop 400 in the operating position with main connection plate 431 engaging pin 162 and locking rod 166 locking plate 431 in position. Locking rod 166 locks prop 400 into position by being threaded through bracket 165 till it reaches the top of main connection plate 431. Longitudinal forces from prop 400 are transferred through pin slot 432 in main connection plate 431, connection pin 162 and hull side plate 161 to main body 100. Lesser magnitude transverse forces are transferred from main connection plate 431 via locking rod 166 to bracket 165 and from there to hull 100. Control ropes 472 and 474 connected to leg and rope connection plate 433 via shackles 471 and 473.

Figure 7C:
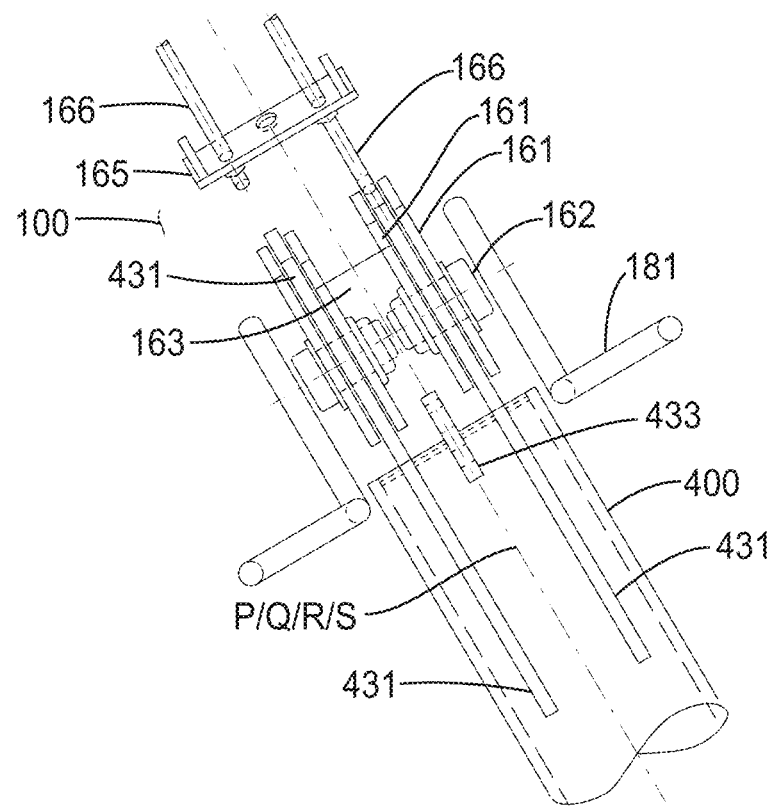
FIG. 7c shows a top end view of the embodiment of FIG. 7a the operating position.

FIG. 7c illustrates a top view of an embodiment of prop-main hull connection with prop 400 in the operating position, with main components plates 431, pin 162 and locking rods 166. One locking rod 166 is shown in the service position at a distance from main connection plate 431, the other in the operating position engaging with main connection plate 431.

Figure 7D:
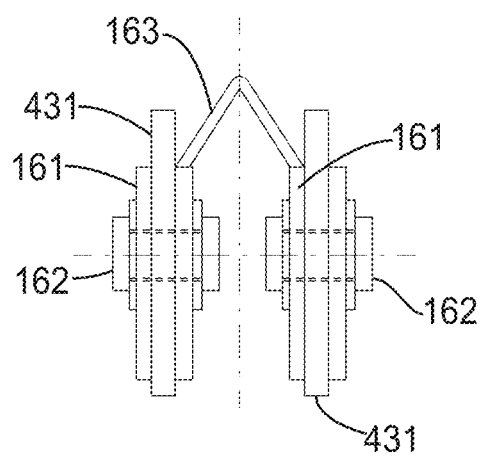
FIG. 7d shows the plates of main hull-prop connection of the embodiment of FIG. 7a in an operating position.

FIG. 7d shows a section of an embodiment through main connection plates 431, hull side connection plates 161, connection pin 162 and guide plates 163 in the operating position of prop (400).

Figure 7E:
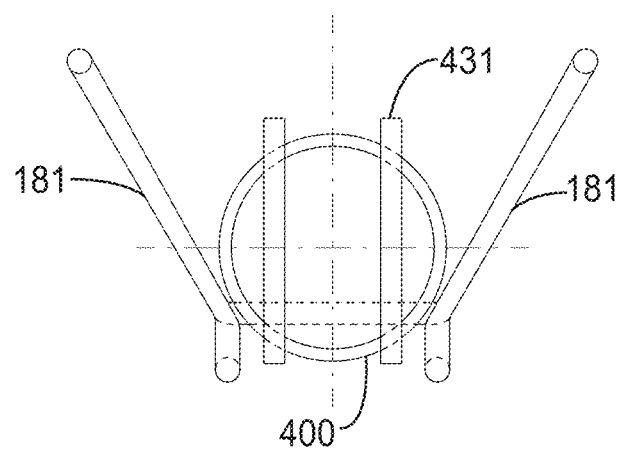
FIG. 7e shows the guide of main hull-prop connection of the embodiment of FIG. 7a in an operating position.

FIG. 7e is a section through top end of embodiment prop 400 in the operating position showing main connection plates 431 and guide frames 181.

Figure 7F:
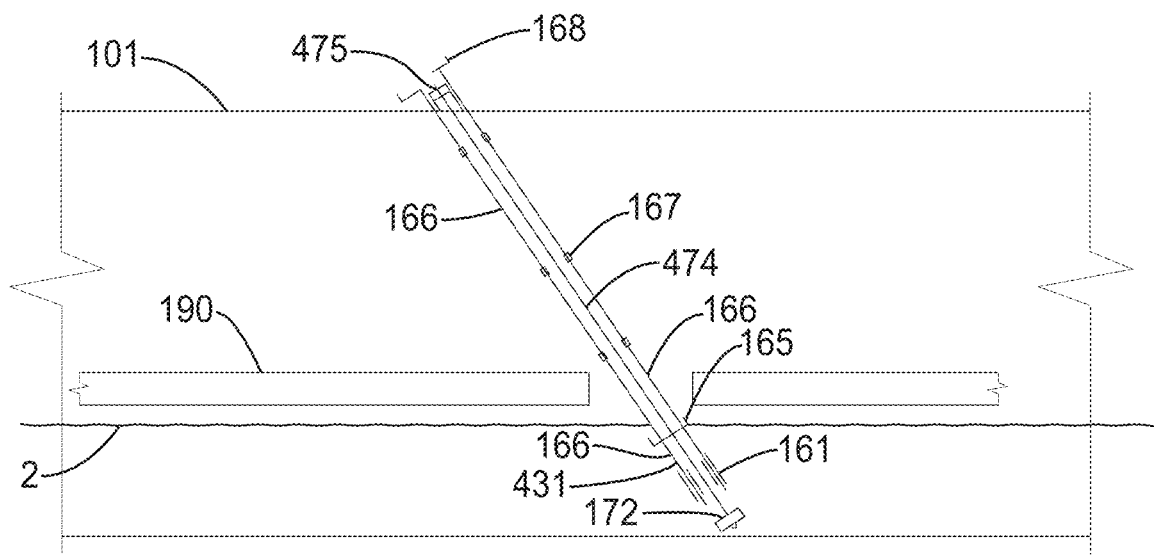
FIG. 7f shows the locking mechanism of main hull-prop connection of the embodiment of FIG. 7a in an operating position.

FIG. 7f shows the locking rod 166 layout on side of main body 100 with prop control rope 474 and access platform 190. Locking rod 166 is guided by brackets 165 and 167 and has handle 168 at top deck 101 allowing locking/unlocking prop connection from above. Main connection plates 431 and hull side connection plates 161 are also indicated as well as control rope roller 172, control rope 474 and control rope winch 475.

Figure 8A:
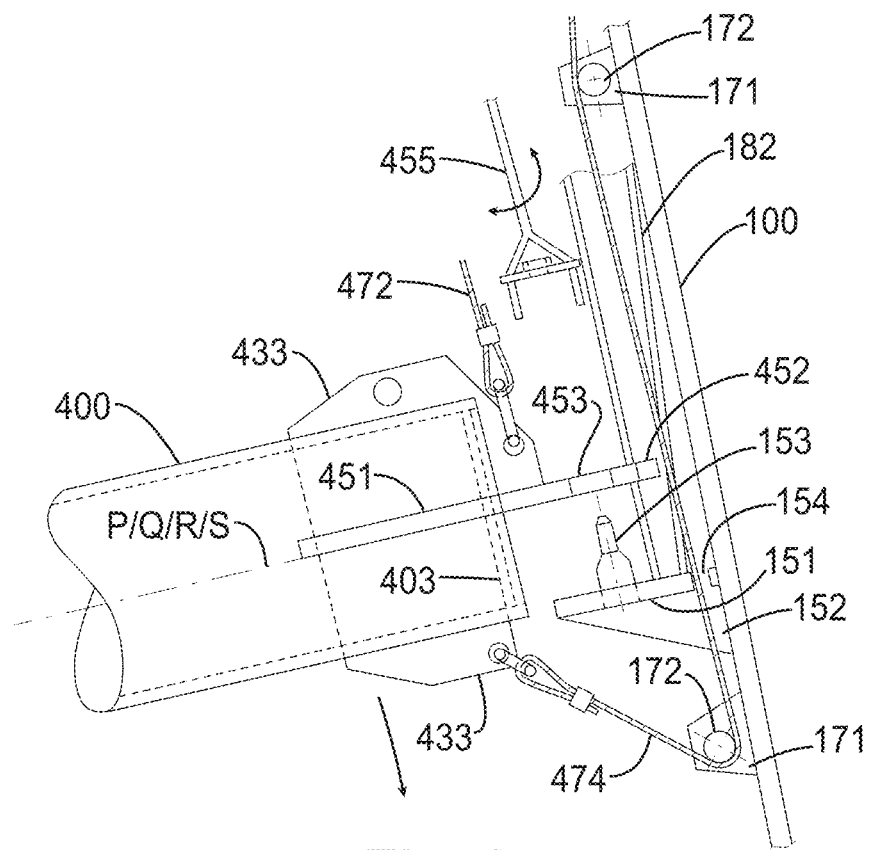
FIG. 8a shows a side view of the main hull-prop connection of an alternative embodiment.

FIG. 8a is a side view of the prop-main hull connection with alternative connection plate 451, shear pins 153 and locking device 455. Top end of prop has alternative main connection plate 451 aligned parallel with leg-prop hinge (320) and perpendicular to leg and rope connection plate 433 and end plate 403. Alternative hull side connection plate 151, attached to main hull 100 and stiffened by plate 152 holds shear pins 153 to engage with pin holes 453 in main connection plate 451. In operating position plate 451 rests on plate 151, shear pins 153 pass through holes 453 and engage with locking device 455 clamping plates 451 and 151 together.

Movement of prop 400 towards main body 100 is guided by main connection plate guide nib 452 sliding within alternative connection guide channel 182.

Control rope hole 154 in plate 151 allows the threading through of control rope 474. Rollers 172 held by roller frames 171 lead control rope 474 towards winch 475.

Figure 8B:
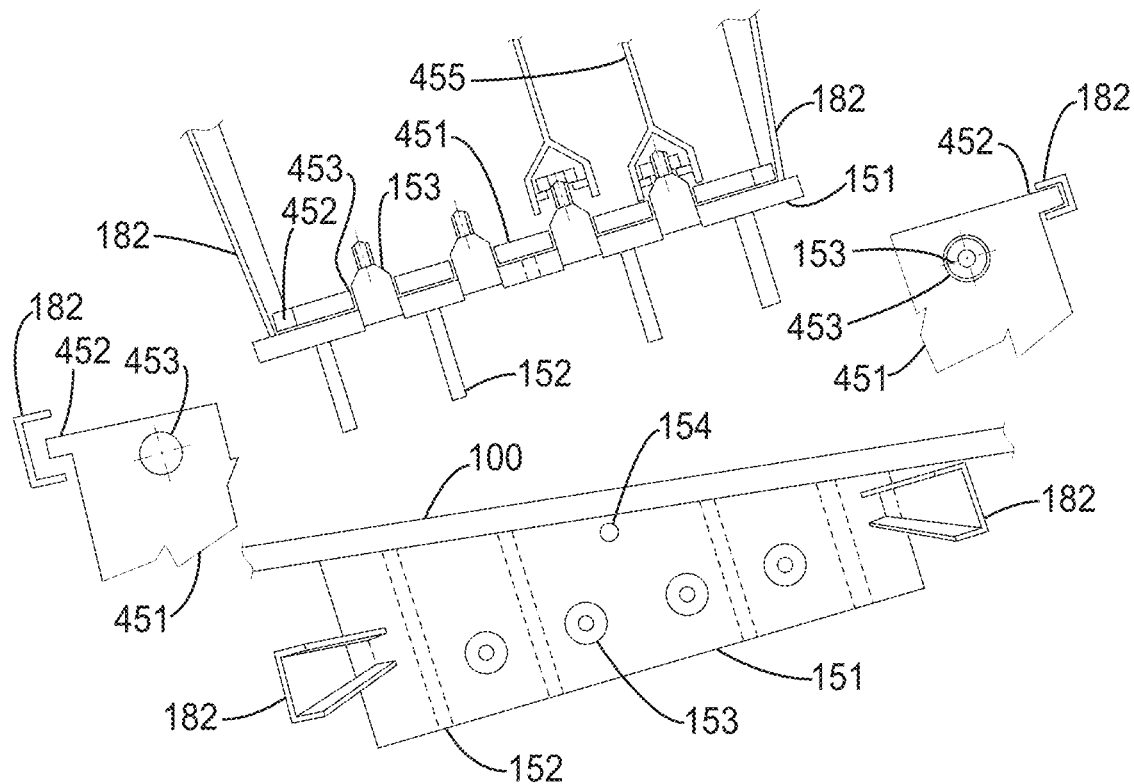

FIG. 8b shows an alternative prop-hull connection showing plan view and section, with main connection plates 1, 451 and shear pins 153 as main components. The figure shows hull side connection plate 151 with stiffener plates 152, shear pin holes 153, control rope hole 154 attached to main body 100 and guide channels 182 attached to connection plate 151. Plan details show main connection plate 451 with guide nib 452 and pin hole 453 engaging with guide channel 182 and shear pin 153 respectively. Section shows main connection plate 451 and hull side connection plate 151 in operating position, shear pins 153 engaged with pin holes 453 and locking device 455. Shear pins 153 have larger diameter shear body engaging with plate 451 and smaller diameter threaded top engaging with locking device 455.

Figure 8C:
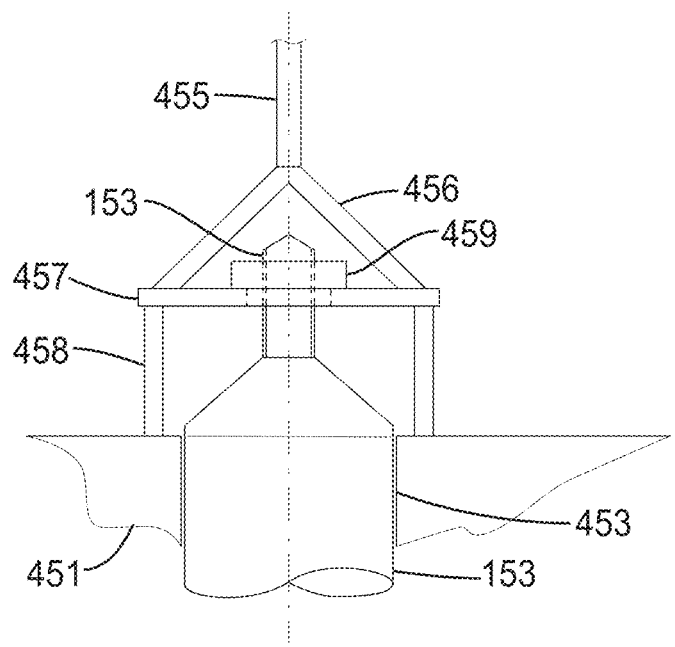

FIG. 8c shows details of the locking device 455, including main connection plate 451 with pin hole 453 engaging shear pin 153. Parts of the locking device are frame 456 attaching handle 455 to main plate 457 having clamping cylinder 458 and locking nut 459 attached to it as well. Main connection plate 451 and hull side connection plate 151 are locked together by making shear pins 153 effective by turning locking device 455 to engage locking nut 459 with the threaded part of shear pin 153 and tightening.

Figure 9A:
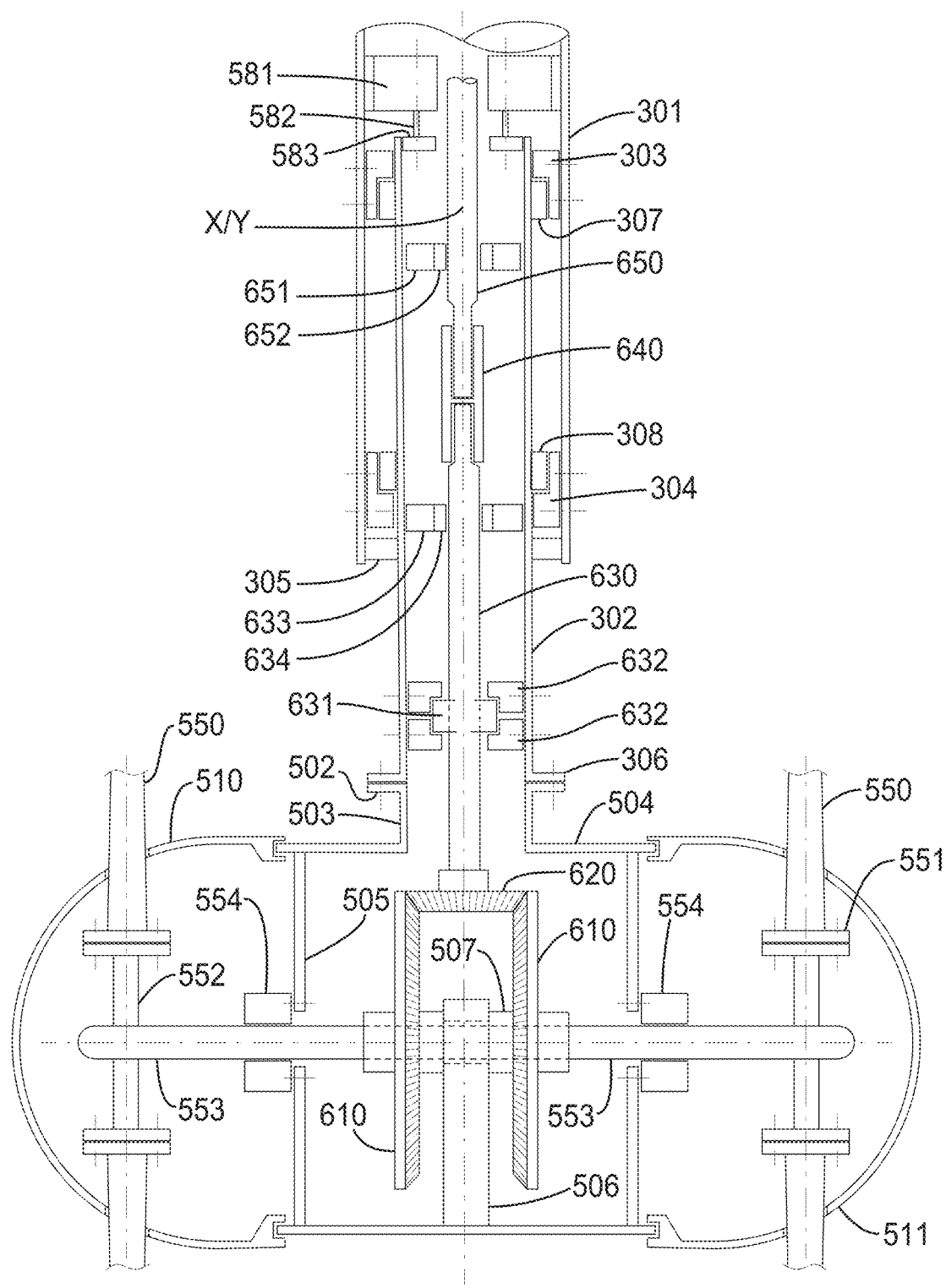
FIG. 9a shows a side view of a leg and nacelle with a gear drive train of an embodiment.

FIG. 9a is a longitudinal section showing embodiment of upper 301 and lower leg 302 connection with bearing casings 303/304, bearings 307/308 and shaft seal bearing 305 as main components as well as potential utilisation—Horizontal Axis Tidal Turbine (HATT) with mechanical drive train assumed. Indicative section through nacelle (501) and mechanical drive train, taken along turbine axes 553.

Upper-lower leg 301/302 connection via top/lower bearing housing 303/304 attached to inside of upper part of leg 301 and top/lower bearings 307/308 attached to outside of lower part of leg 302 allowing engagement of bearings 307/308 with housing 303/304 and rotation of lower part 302 around axes X/Y. Bearings 307 and 308 are dual action bearings in that they provide for the rotation of lower leg 302 and also work as thrust bearings preventing lower leg 302 slide up/down along axis X/Y relative to upper part 301. Shaft seal 305 attached to lower end of leg 301 ensures watertight connection. Potential utilisation for HATT would include nacelle connection flange 306 and leg connection flange 502 bolted together, main body of nacelle 504 connecting to flange 502 via attaching 'neck' 503. In potential arrangement turbine blades 550 connect to stub shaft 552 via connection plates 551. Bulk head 505 attaches to main body of nacelle 504 and holds shaft bearing 554 to effect watertight connection around shaft 553. Bearing support frame 506 and bearing 507 support the inner end of shaft 553.

Front 510 and rear 511 nacelle covers rotate with the turbine blades 550. Torque from the rotation of turbine blades 550 carried through shaft 553 to horizontal axis gear wheel 610, to inclined axis gear wheel 620 to shaft 630 and through shaft splice 640 to upper shaft 650. Thrust bearing 631 is held by bearing housing 632 attached to lower part of leg 302. Bearing 634 attached to lower leg 302 via bearing frame 633 provides the second point of support for lower shaft 630. Top part of dive shaft 650 is supported by bearing 652 attached to lower part of leg 302 via bearing frame 651. This arrangement allows the rotation of shaft 630 and 650 around axes X-Y as well as the rotation of lower part of leg 302 and nacelle 501 relative to upper part of leg 301. This rotation could be driven and controlled by drive unit 581 via shaft 582 and drive wheel 583 engaging with lower part of leg 302.

Figure 9B:
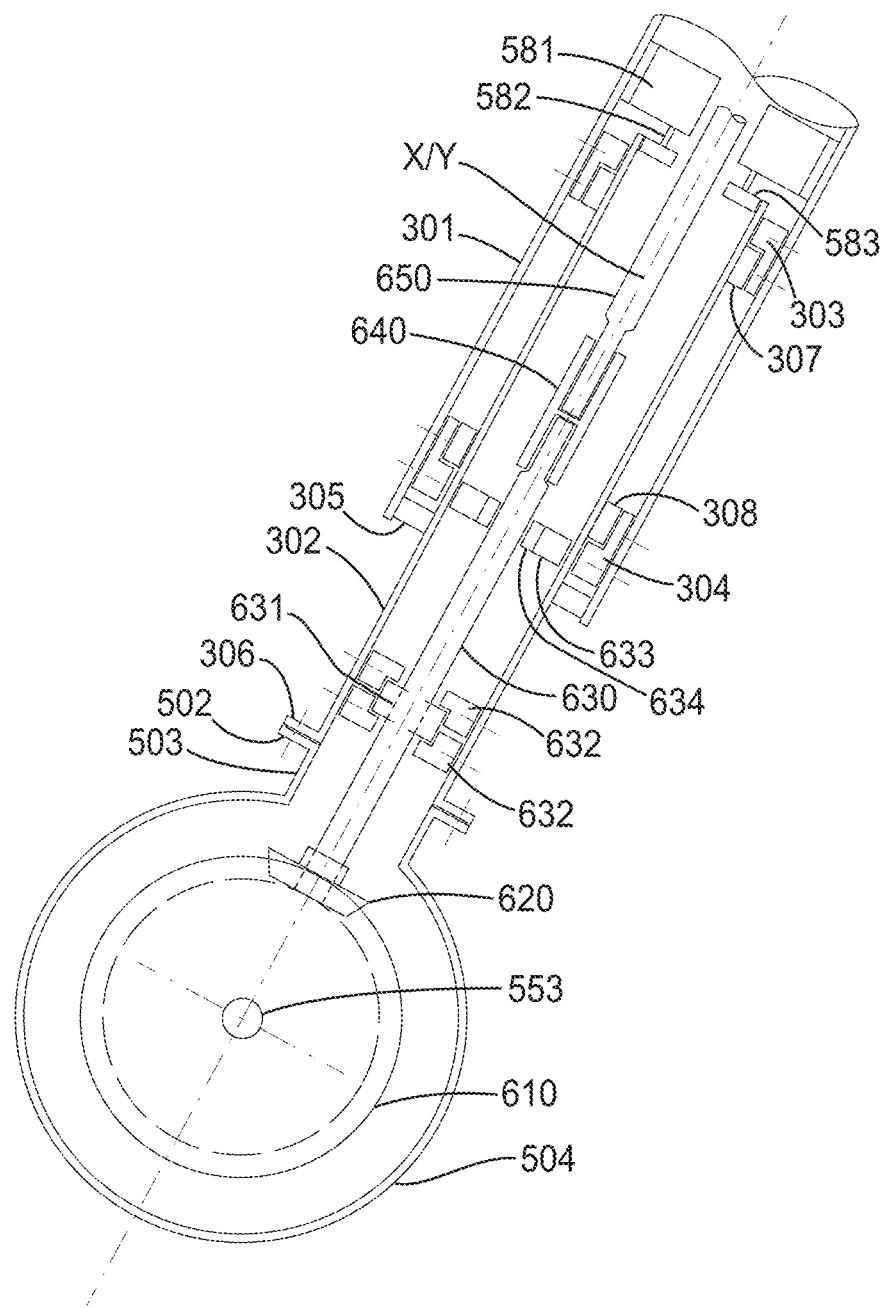

FIG. 9b shows a transverse section of the upper-lower leg connection and potential utilisation by HATT with mechanical drive train. Horizontal Axis Tidal Turbine with blades assumed. Indicative section through leg 301/302 taken perpendicular to turbine axes 553. Description of components as above in FIG. 9a.

Figure 9C:
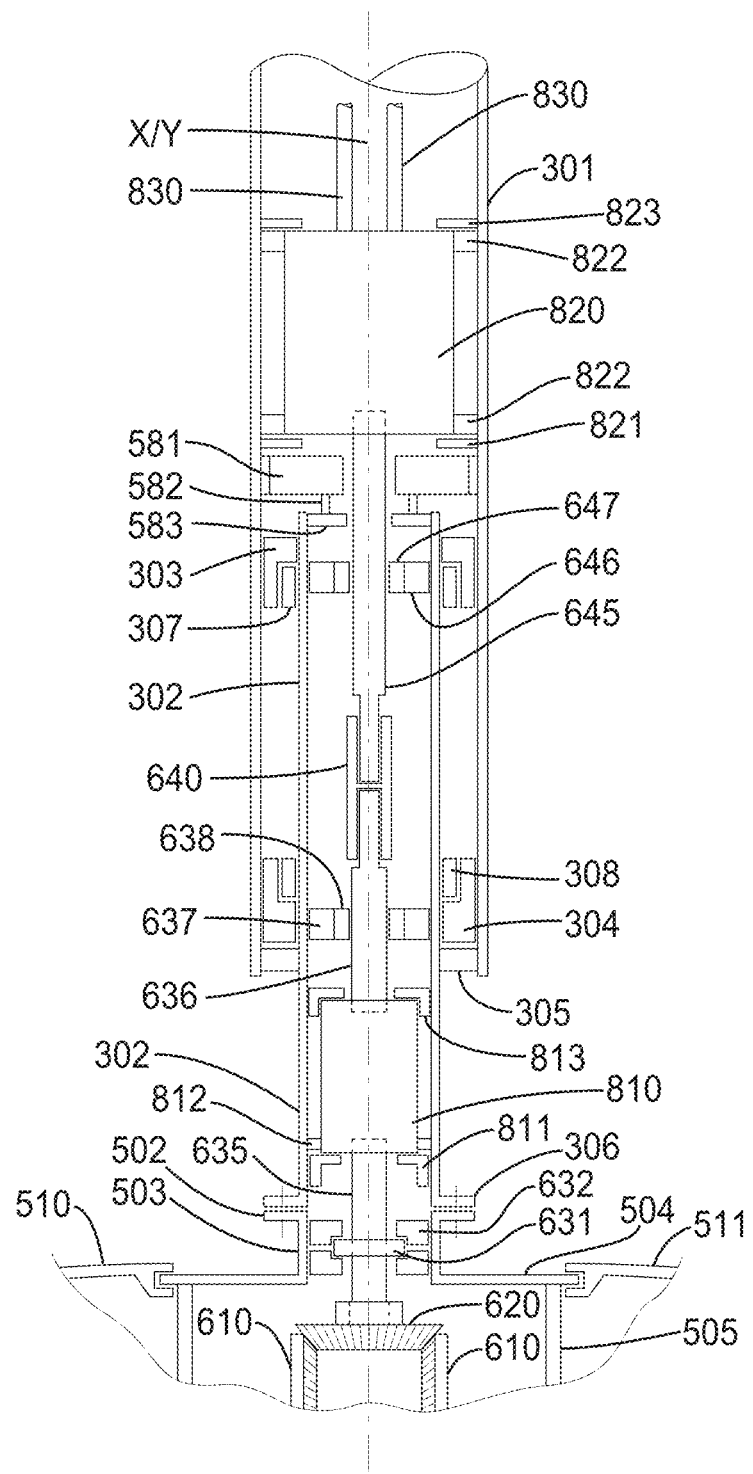
FIG. 9c shows a side view of a leg and nacelle with a hydraulic drive train of an embodiment.

FIG. 9c shows a partial section of upper-lower leg connection and potential utilisation by HATT with hydraulic drive train, showing schematic location of transmission/gear box 810 and hydraulic pump 820. Horizontal Axis Tidal Turbine with hydraulic drive train assumed.

Indicative section through nacelle 501 taken along turbine axes 553 showing potential hydraulic drive train. Leg 301 to leg 302 and to nacelle 501 connections as on FIG. 9a.

In potential utilisation hydraulic drive train composed of gear box/transmission 810 supported on lower/upper mounting frames 811/813 with position adjustment packers 812 installed in lower part of leg 302 and hydraulic pump 820 supported on mounting plates 821 and 823 with adjustable packer 822 installed in upper part of leg 301. Gear wheel 620 transfers torque to gear box 810 via shaft 635, gear box 810 connects to hydraulic pump 820 via shaft 636 held by bearing 638 attached to lower leg 302 via bearing frame 637, shaft splice 640 and shaft 645 held by bearing 647 mounted on bearing frame 646. Hydraulic pump 820 connects to on-board plant via hydraulic pipes 830.

Figure 10A:
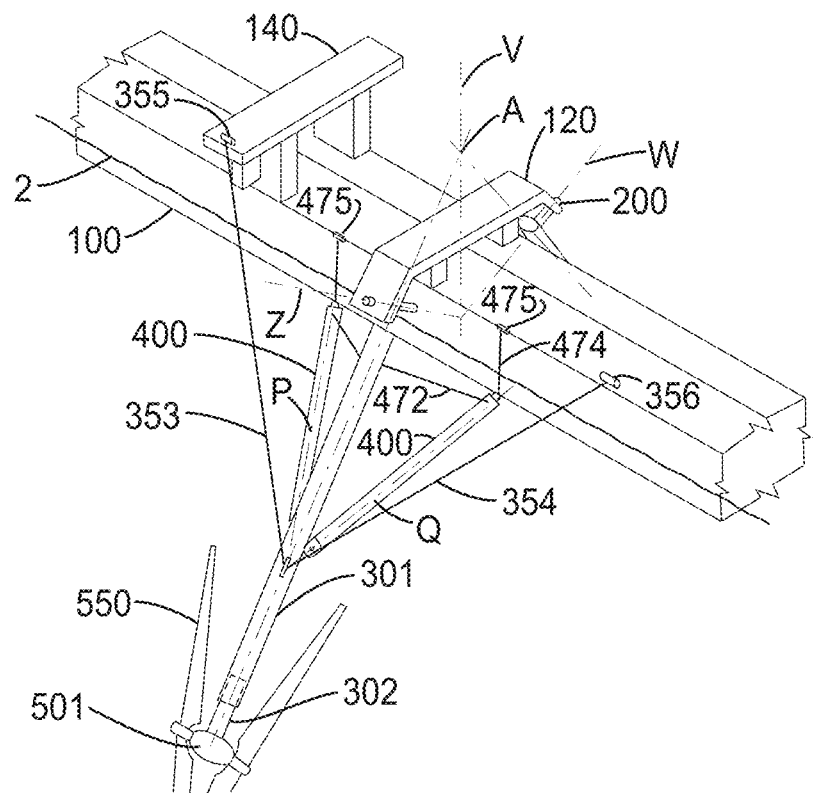
FIG. 10a shows an axonometric view of a horizontal axis turbine utilised with the invention in an operating position.

FIG. 10a is an axonometric view of potential utilisation with HATT in operating position.

Horizontal Axis Tidal Turbine with blades assumed. Operating position is shown with leg 301/302 secured in position by props 400 connecting to main body 100 and holding nacelle 501 and turbine blades 550 under the water surface 2 and away from main body 100.

Leg control ropes 353 and 354 connect to winches 355 and 356 respectively, top prop control ropes 472 connect to leg 301 and top of prop 400, lower control ropes 474 connect to winches 475. The external end of main hinges 200 are held by the pin/hinge support structure 120, leg support structure 140 is not connected to leg 301 in this position.

Figure 10B:
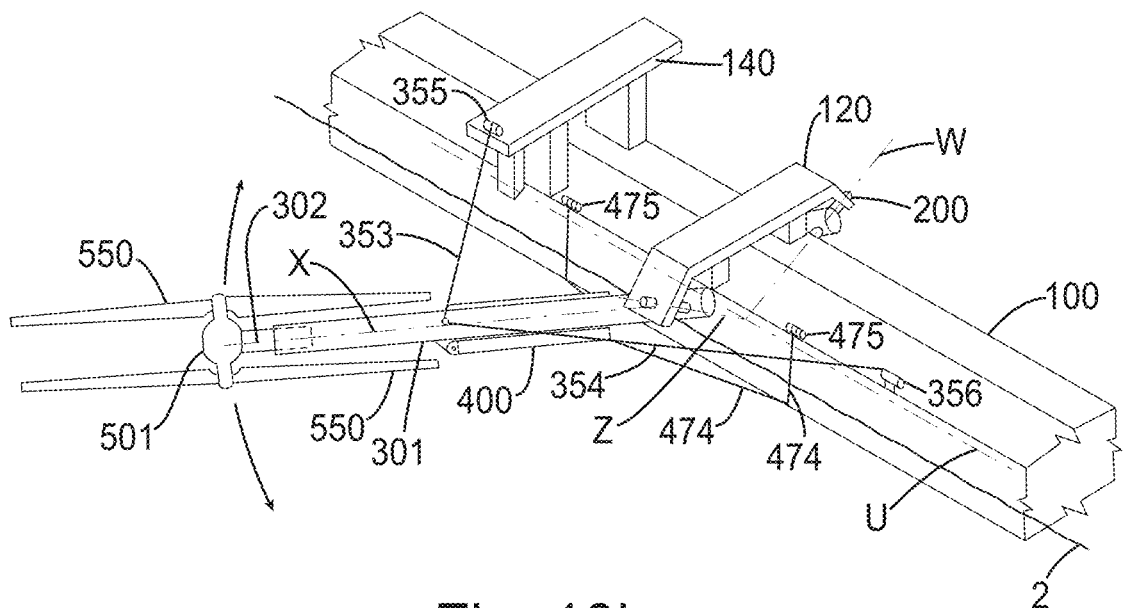
FIG. 10b shows an axonometric view of a horizontal axis turbine of FIG. 10a in an intermediate position.

FIG. 10*b* is an axonometric view of potential utilisation with HATT in transition between operating and service positions. Horizontal Axis Tidal Turbine with blades assumed.

The legs 301 and 302 are in transition between operating and service positions. Turbine blades 550 are aligned with leg 301 and props 400 are folded and secured to legs 301. Movement towards leg support structure 140 achieved by winch 355 pulling leg 301 while winches 356 and 475 are letting out to allow movement. Movement towards operating position achieved by winch 356 puling and winch 355 letting out while winches 475 are just taking up the slack in the control rope.

Figure 10C:
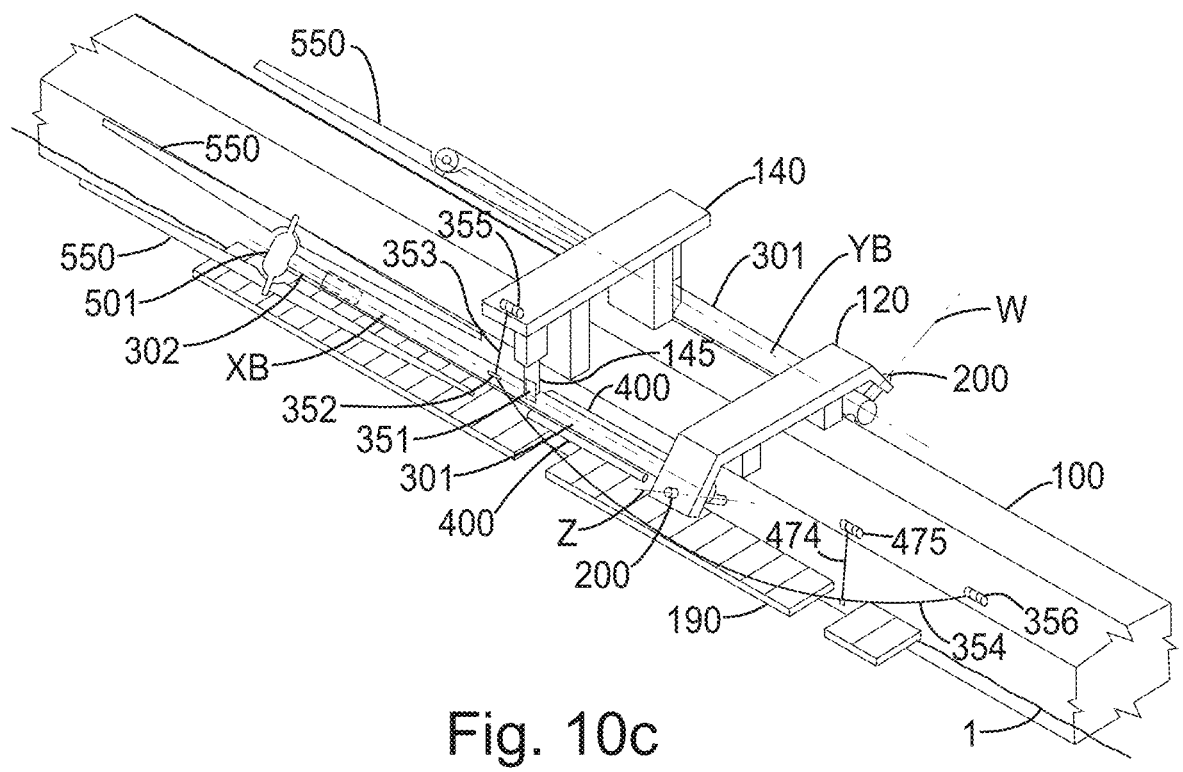
FIG. 10c shows an axonometric view of a horizontal axis turbine of FIG. 10a in a service position.

FIG. 10*c* is an axonometric view of potential utilisation with HATT in service position. Horizontal Axis Tidal Turbine with blades assumed. Legs 301 and 302 in the service position XB and YB, attached to leg support structure 140 via connection plates 351 and 145. Turbine blades 550 aligned with leg 301. Leg control rope 353 is taut, rope 354 is slack. Access platform 190 indicated.

Figure 11A:
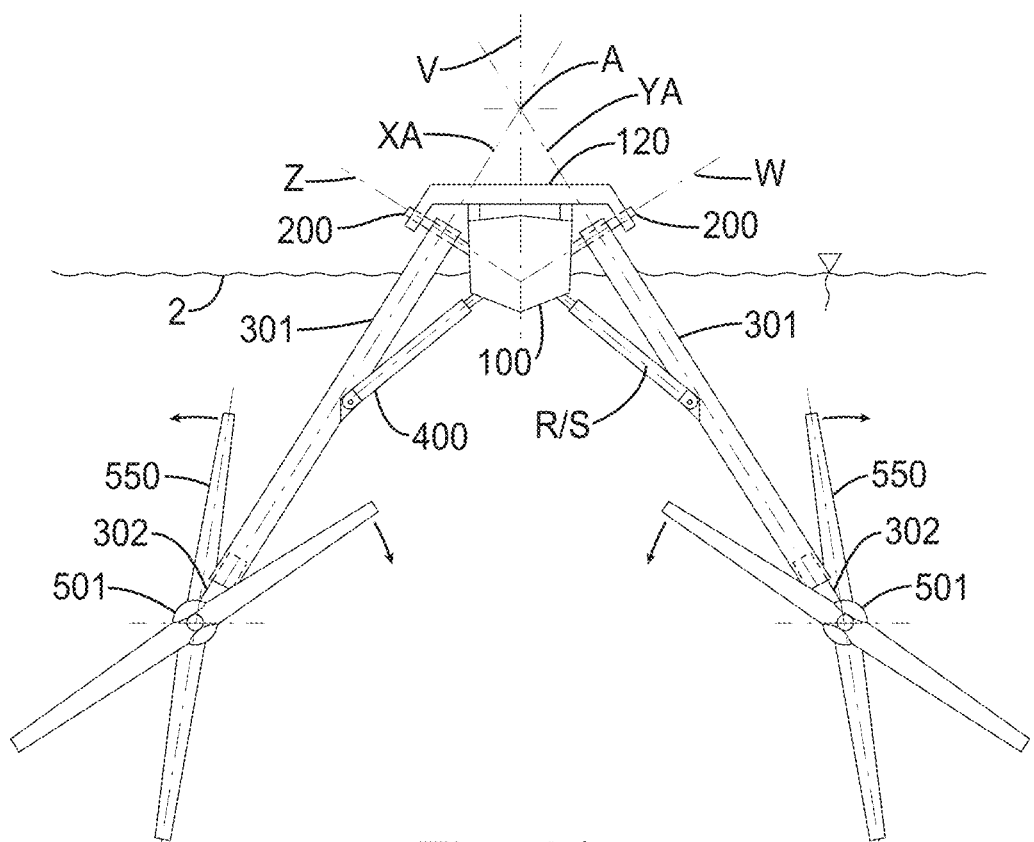
FIG. 11a shows an end view of the general arrangement of a horizontal axis turbine utilised with the assembly.

FIG. 11*a* shows an end view of potential utilisation with HATT in operating position. Horizontal Axis Tidal Turbine with blades assumed.

Figure 11B:
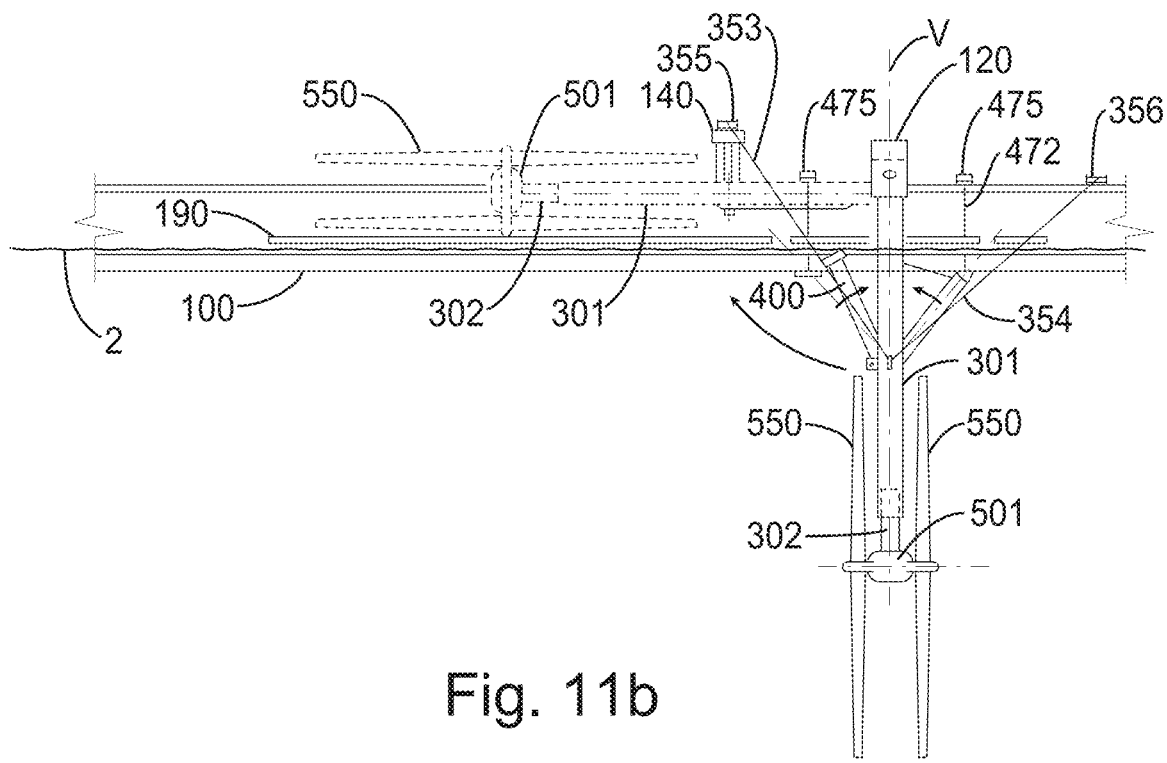

FIG. 11*b* shows a side view of potential utilisation with HATT in operating and service position. Horizontal Axis Tidal Turbine with blades assumed.

Figure 12A:
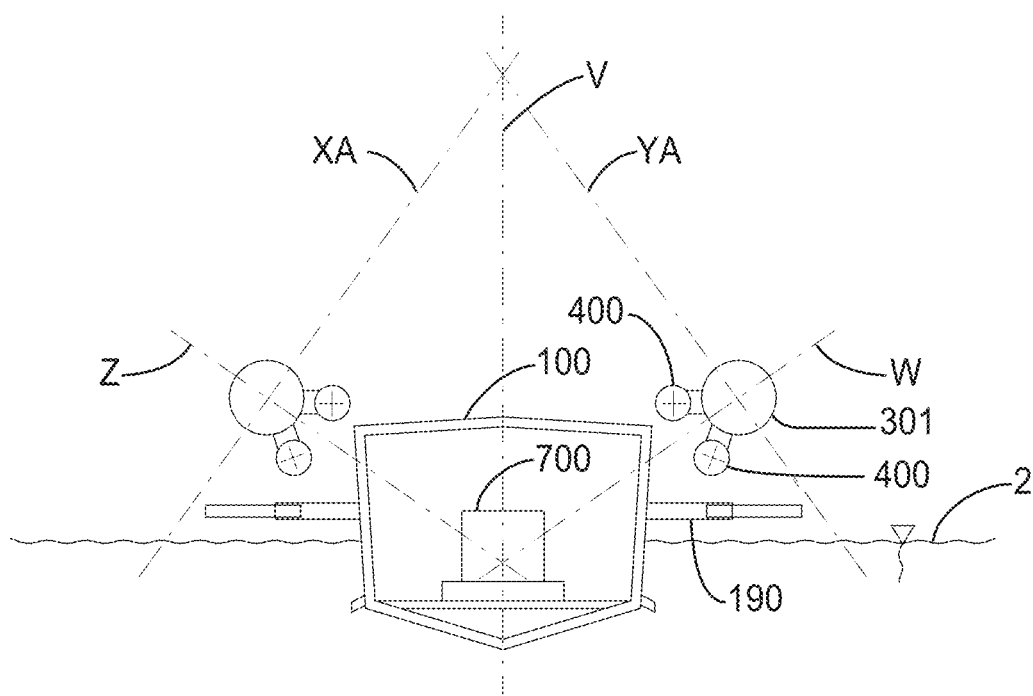
FIG. 12a shows a horizontal axis turbine utilised with the invention in a first section with the assembly in a service position.

FIG. 12*a* shows a section of potential utilisation with HATT in service position, taken near prop attachment. Horizontal Axis Tidal Turbine with blades assumed. Schematic cross section through legs 301 and props 400.

Figure 12B:
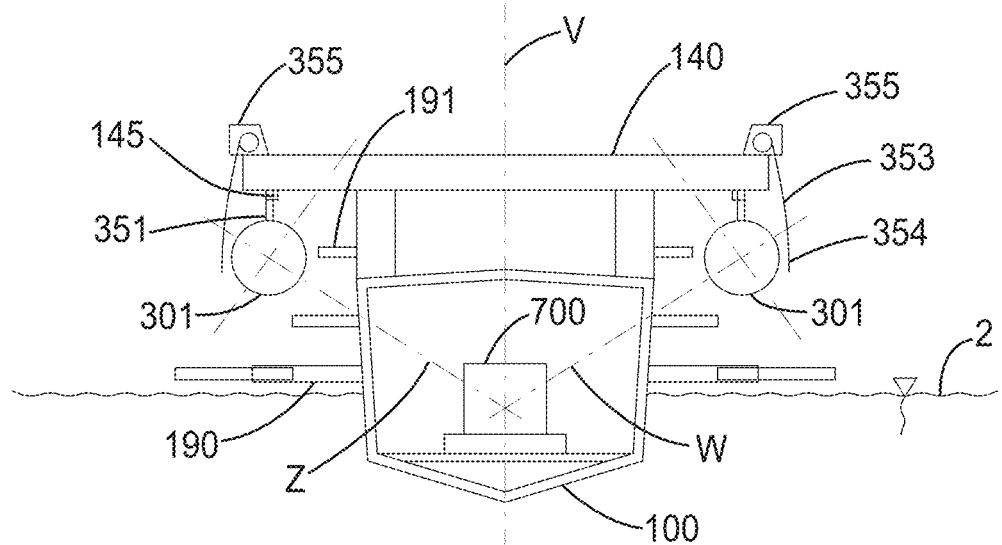
FIG. 12b shows a horizontal axis turbine of FIG. 12a in a second section.

FIG. 12*b* illustrates a section of potential utilisation with HATT in service position, taken near leg support structure 140. Horizontal Axis Tidal Turbine with blades assumed.

Schematic cross section near leg support structure 140.

Figure 12C:
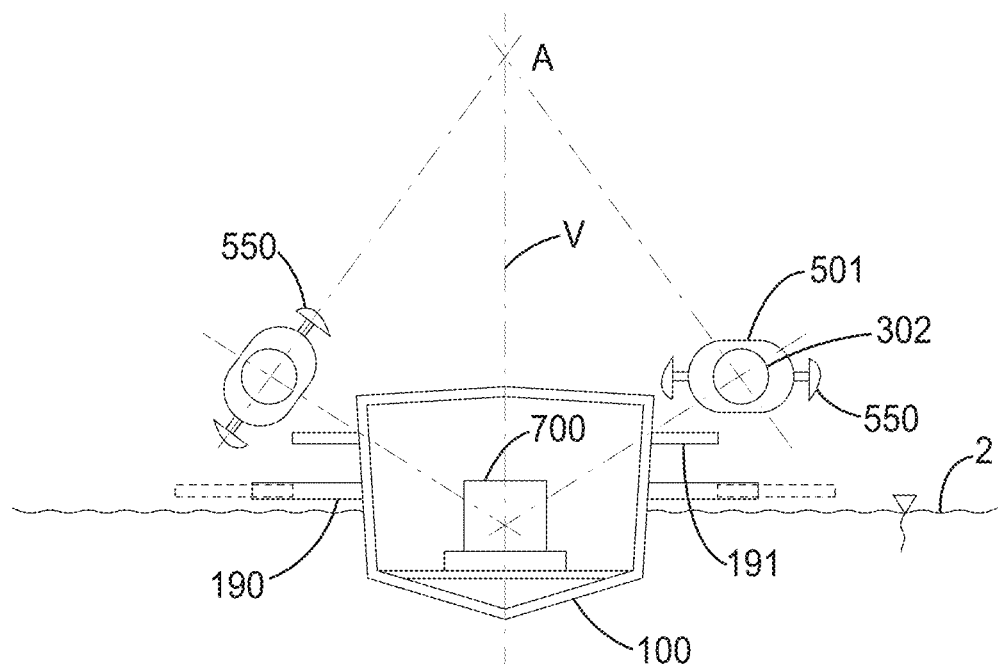
FIG. 12c shows a horizontal axis turbine of FIG. 12a in a third section.

FIG. 12*c* illustrates a section of potential utilisation with HATT in service position, taken near nacelle. Horizontal Axis Tidal Turbine with blades assumed. Schematic cross section near nacelle 501.

Figure 13A:
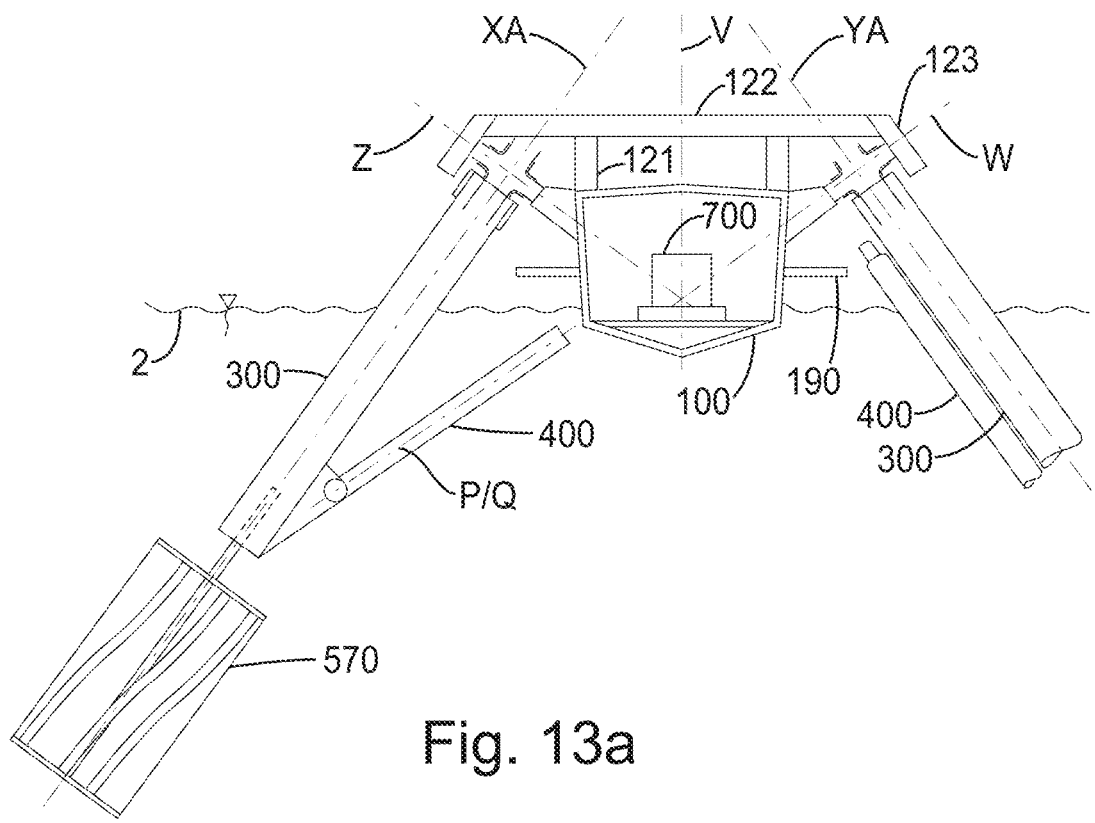
FIG. 13a shows an end view of a vertical axis turbine utilised with the invention in an operating position.

FIG. 13*a* is an end view of potential utilisation with Modified Vertical Axis Tidal Turbine. Modified Vertical Axis Tidal Turbine assumed. The figure shows main body 100, parts of pin support structure 121, 122, 123, legs 300, props 400 main on-board plant 700 and access platform 190. Vertical turbine 570 shown schematically.

Figure 13B:
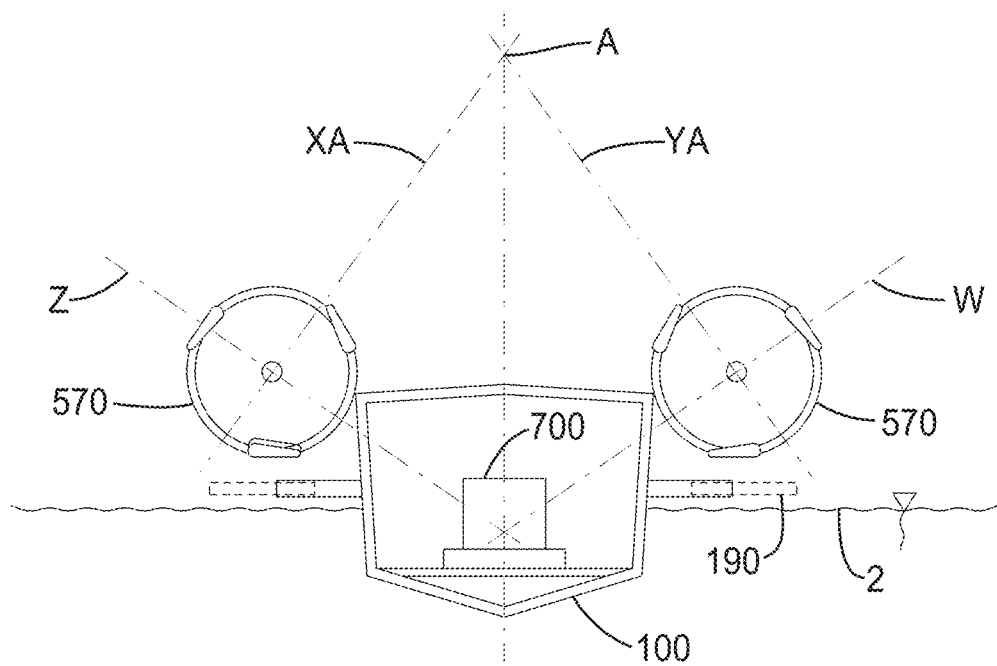
FIG. 13b shows a section view of the vertical axis turbine of FIG. 13a, in a service position.

FIG. 13*b* shows an end section of potential utilisation with Modified Vertical Axis Tidal Turbine, taken through turbine. Modified Vertical Axis Tidal Turbine assumed. Schematic cross section through vertical axis turbine 570 in service position.

Figure 13C:
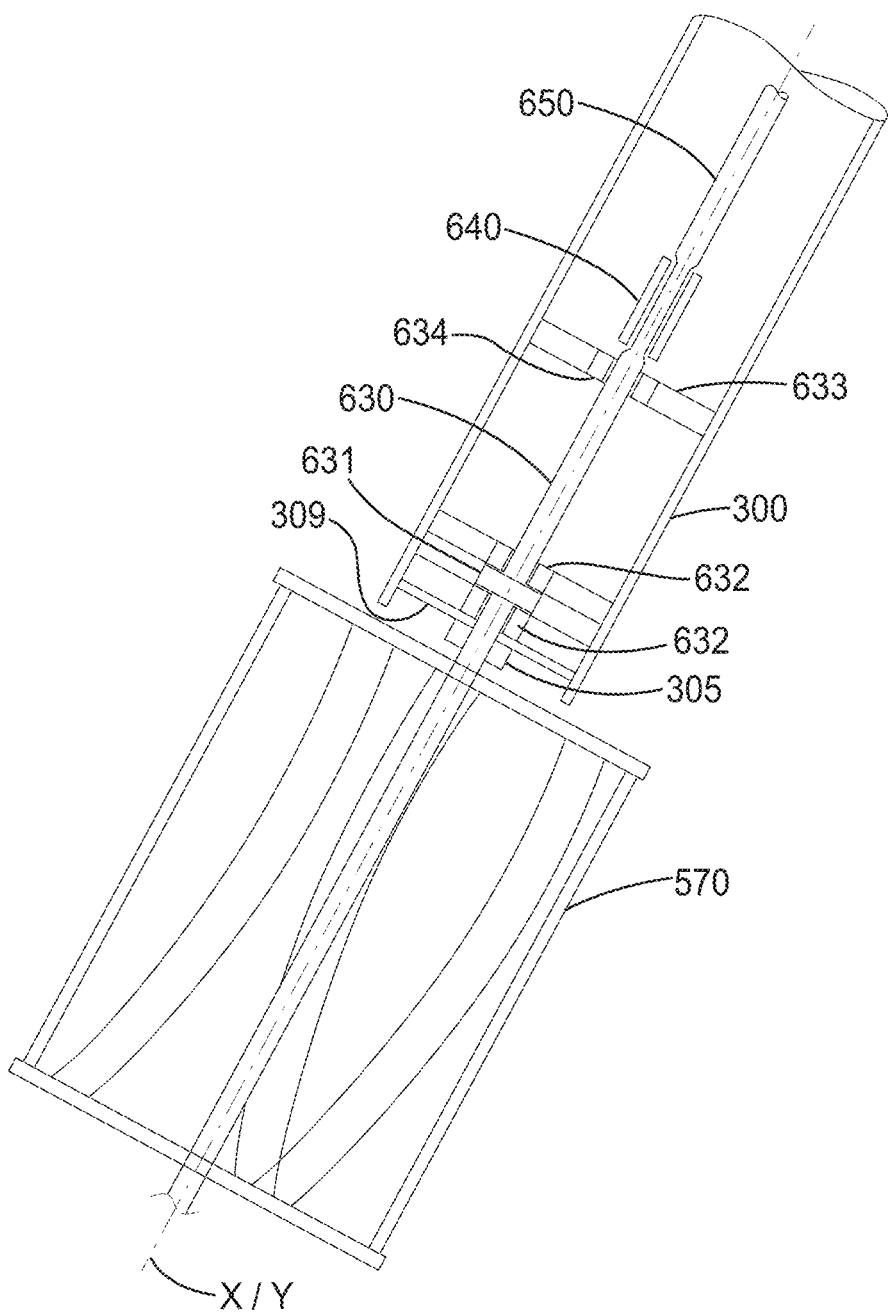

FIG. 13*c* provides schematic detail of potential utilisation with Modified Vertical Axis Tidal Turbine. Modified Vertical Axis Tidal Turbine assumed. Detail section through leg 300 showing shaft seal/bearing 305, bulk head/end plate 309, shafts 630 and 650 with shaft splice 640, thrust bearing 631, thrust bearing housing 632, bearing frame 633, and bearing 634. Vertical Axis Turbine 570 shown schematically.

Figure 14A:
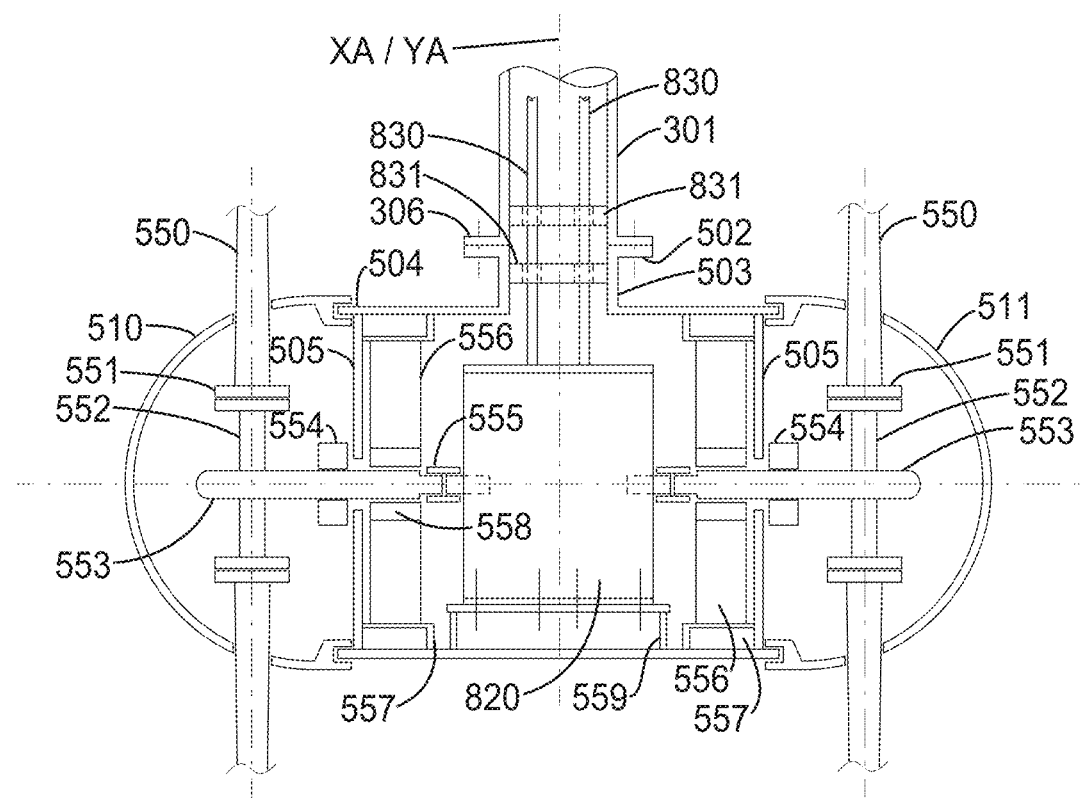
FIG. 14a shows a side view of a horizontal axis turbine with a hydraulic pump in the nacelle utilised in an embodiment of the assembly.

FIG. 14*a* shows a longitudinal section through nacelle showing potential utilisation with HATT and hydraulic drive train, shoving schematic location of low speed hydraulic pump. Horizontal Axis Tidal Turbine assumed. Potential arrangement with low speed hydraulic pump without transmission/gear box. Turbine axis 553 coupled to low speed hydraulic pump 820 via pump shaft splice 555. Shaft 553 also held by bearing 558 mounted on bearing frame 556 attached to nacelle body 504 via bearing frame base 557. Hydraulic pipes 830 are held to nacelle body 503 and to leg 301 by pipe brackets 831.

As previously stated, an objective of the invention is to provide a marine power plant whose assembly allows of movement of the operating unit (underwater plant) 500 from specified position underwater (operating position) to another specified point above water and next to body of the host vessel (service position) by adopting an inclined hinge 200 around which the link element 301, 302 holding the operating unit 500 rotates, as can be seen in FIG. 1*a*.

This results in the operating unit travelling in an inclined plane from position XA to XB or back. The exact location and inclination angle AL of hinge axes W and Z and the length of the link/keg element 301/302 are designed to place the operating unit 500 into the desired positions specified by depth below water surface and distance from body of vessel for the operating and height above water surface and distance from body of vessel for the service positions.

Typically axes V, W, Z, XA and YA are in a plane normal (perpendicular) to the longitudinal axis U, this plane being depicted by points D, E, F, T, G, H, I, J and K.

The position of point O—intersection of axes W, Z, V and U—is being determined by the size of the on-board plant 700 and the position of the internal plant main axis 710, see FIG. 2*a* and FIG. 4*a*.

Hinge points B and C on axes Z and W are determined such that leg 301 and the folded-up props 400 are clear of the main body 100 in the service position indicated by axes XB and YB, see FIG. 12*a*. Space requirements for servicing the operational unit also influence the position of points B and C.

Lateral distance/space for servicing nacelle can be provided by rotating axes W and Z around axis V out of the normal plane. FIG. 1*b* shows axis YA in the normal plane and YAC rotated by angle BET around axis V. The horizontal position of link/leg 301 is XB corresponding to axis position W and YBC corresponding to axis WC. While this provides more space for the operating unit, it complicates detailing and increases the total width of the unit.

The layout and construction of the main hinge is in two parts, both aligned on the same axis, one attached directly to the main vessel, the other via the hinge support structure. Both hinges are cylindrically shaped allowing a shaft being installed through the two cylindrical openings, aligned on the same axis as the bearings and rotating independently of the link element. This allows for a drive train of shafts and bevel gears from the link element through the hinge into the body of the host vessel. Absence of said drive train and shaft allows pipes and cables being led through the opening.

An embodiment of the above feature is best shown on FIGS. 4*a*, 4*b* and 4*c*.

On the hull side connection plates 232 and 233, attached to the main hull 100 hold the bearing mounting plate 234. The fixed part of bearing 235 is attached to mounting plate 234 via its flange in a manner allowing adjustment of position so bearing 235 can be lined up with the other bearings 245, 225 and 215. The cylindrical part of 235 is shaped both on the inside 238 and outside 237 to provide a bearing surface to shaft 680 on the inside and to rotating bearing 236 on the outside.

Rotating part 236 has bearing surface on the inside of the cylindrical part 237—bearing against the external face of bearing 235—and flange attached to main connection plate 310 of link/leg 301.

On the external side the arrangement is similar, fixed bearing 245, attached to hinge support structure 123 by its flange, holds shaft 680 on the inside through bearing surface 248 and rotating bearing 246 on the outside via face 247.

Interfaces 237, 238, 247 and 248 are to be bearing surfaces allowing relative rotation and able to transfer forces acting in the direction of the link/leg 301 axis XA.

This arrangement allows shaft 680 and link/leg element 301 both to rotate around axis Z independently.

Guide angles 239 and 249 are attached to connection plate 232 and hinge support structure 123 respectively and extend in a circular shape around axis XA to take up forces acting transversely to link/leg axis XA, transmitted by leg stiffener and guide plates 311.

The above arrangement makes it possible to construct a mechanical shaft-bevel gear-shaft drive train between the operational unit (500) via shafts (630) and 650 by having a bevel gear 660 attached on shaft 650 fitting between the main connection plates 310 of link/leg 301, engaging with bevel gear 670 fitted on shaft 680 which has bevel gear 690 attached, engaging gear 710 of the main on-board plant 700.

Inside the main hull 100 there are simple fixed bearings 225 and 215 with internal face serving as bearing to shaft 680 and flanges allowing position adjustment and connection to mounting plates 224 and 214, which are in turn attached to connection plates 222, 223 and the hull side and 212 and 213 on the main plant side. The ends of bearings 225 and 215 serve as thrust bearings against thrust bearings 681 and 682. Thrust bearing are necessary as bevel gears generate longitudinal—acting along the shaft—forces which need to be resisted by the arrangement.

The leg side shaft 650 has its thrust bearing 653 and thrust bearing housing 654 at the top of the link/leg element 301, attached to thrust bearing holding plate 312.

The arrangement of bearings 235 and 245 allows for hydraulic pipes 830 of a hydraulic drive train to pass through the central opening of bearing 235, as shown on FIG. 4c. In this case there are no shafts and gear wheels required.

Link/leg members 301/302 are moved between service and operating positions by ropes 353 and 354 attached to winches 355 and 356 respectively. See FIGS. 2b, 2c, 10a and 10b.

The ropes connect to rope connection plate 352 attached to upper leg 301 near the leg-prop hinges. One of said winches tightening, the other relaxing would rotate leg 301/302 around main pin 200 (axis W or Z). Designing leg 301/302 and operating unit 500 in a manner as to achieve close to neutral buoyancy of leg 301/302 and nacelle 500 allows easier moving of leg 301/302.

In service position connection plate 351 attached to leg 301 and connection plate 145 attached to leg support structure 140 come in contact and are connected to secure leg 301/302 in the service position. This can be done simply by bolting them together. See FIGS. 10c and 12b.

Props are used to stabilise the link element and operating unit in the operating position. The props are attached to link element via hinges aligned at a suitable angle and connect to main body of vessel via releasable connection. In service position and during transition from one position to other props are disconnected from main vessel, folded and secured against link/leg element.

Prop-leg connection hinges 320 to be positioned such to avoid interference with the working of the operating unit.

See FIGS. 1a, 2a and 3a. Point L—see FIG. 1b—is at the intersection of link axis XA and prop axes P and Q. Link-prop hinge pins 320 are located above point L on axes P and Q. Props 400 rotate around hinge pin 320 in the LBM and LBN planes.

Connection points M and N are to be located such that the angle between link/leg 301 and prop 400 is approximately 45 degrees in plan—see FIG. 2c—and as large as possible in end view—see FIG. 2a with angle marked GAM on FIG. 1b. The location also must ensure that prop ends can reach the connection point and devices by being rotated from leg 301 towards hull 100, without hitting the side of the hull. FIG. 5a shows leg-prop connection pins 320, leg and prop side connection plates 321 and 421, end plate 402 and stiffener plate 422.

The top end of props 400 has releasable connection to link/leg 301 ensuring a fixed position is maintained while link/leg 301 rotates from service to operating position or back.

FIG. 6a shows one embodiment where the position of the prop 400 is changed and controlled by rope 472 attached to winch 338 mounted onto frame 337 attached to leg 301, and rope 474 attached to winch (475) mounted on deck of hull 101. Guide frame 345 attached to link/leg 301 ensures prop 400 is in required position when rope 472 tightened and prop end connection plate 433 comes to contact with leg side plate 331 allowing locking pin 332 attached to plate 331 pass through hole 434 and hold prop 400 in a fixed position in relation to leg 301.

The prop-hull connection is accomplished by main connection plate 431 having cut 432 allowing engagement with connection pin (162) attached to main hull (100) as prop 400 is rotated around pin 320. Plates 431 are parallel to plane BLM or BLN in which centreline P/Q of props 400 moves. Pins 320 and 162 are oriented perpendicular to this plane (see also FIGS. 7a and 7b).

FIG. 6b shows prop-leg connection with an alternative embodiment of prop-hull connection plate 451 having guide nib 452 and shear pin holes 453. Connection plate 451 is perpendicular to planes BLM and BLN.

The end view of both configurations is shown on FIG. 6c giving details of locking pin 332 attached to push plate 333 and spring 334 connecting plates 331 and 333 in a manner as keeping pin 332 being engaged by plates 331 and 433 but allowing the temporary withdrawal of pin to release plate 433. Guide 345 ensuring plates 331 and 433 meet is also shown. Ropes 472 and 474 connect to plate 433 via shackles 471 and 473 respectively.

Alternatively, plates 331 and 433 can be connected by bolt 341 for the transition as shown on FIG. 6e.

When link/leg 301/302 reaches operating position after moving from position XB/YB to XA/YA, withdrawing locking pin 332 or un-installing bolt 341 releases prop 400 from its locked position. Pulling in rope 474 with winch (475) while keeping rope 472 tight but letting will move prop 400 towards its operating position, top end approaching hull 100. See FIGS. 2b and 7a, 7b, 8a and 10a.

Connection of prop 400 to hull 100 is accomplished by slots 432 in main prop connection plates 431 engaging with pins 162 held by plates 161 connected to main hull 100. Plates 161 provide side support to plates 431 as well. See FIG. 7a—prop 400 approaching hull 100, and FIGS. 7b and 7c—Plate 431 and pin 162 engaged. Guides 181 guide the main body of props 400 while inclined guide plates 163 guide the prop connection plates 431 to between plates 161. See FIGS. 7d and 7e.

Threaded locking rods 166 driven through threaded holes in brackets 165 lock plates 431 in operating position by preventing lift up and disengagement from pin 162. See FIG. 7b.

Threaded locking rods 166 extend to the deck of the main hull 101 allowing operations from above, as the connection is expected be under water due to its low position.

When the connection is due to be released, threaded locking rods 166 are wound up allowing plates 431 move upwards and disengage from pins 162. Tightening winches 338 while relaxing winches 475 will move props 400 towards link/leg 301 allowing securing for transition as described above.

Alternative embodiment of connection between props 400 and hull 100 is accomplished by adopting connection plate 451 in position perpendicular to planes BLN and PLM. Hull side connection plate 151 has same orientation and they match when prop 400 is in correct position. The force transfer is accomplished by shear pins 153 being attached to hull side connection plate 151 engage pin holes 453 in prop side connection plate 451. See FIGS. 8a and 8b.

Shear pins 153 are attached to plate 151 in a manner strong enough to resist calculated shear forces. Their large diameter base engages through the thickness of plate 451 providing shear and bearing resistance and smaller diameter threaded end engages with the threaded plate/locknut 459 of locking device 455. See FIG. 8c for details of locking device.

Prop end connection plates 451 are being guided into position by guide nibs 452 sliding in guide channels 182 attached to plates 151.

The link elements are formed in two parts (upper and lower) having a common longitudinal axis and allowing rotation of the lower part around the longitudinal axis.

One embodiment of this feature is accomplished by forming upper leg 301 and lower leg 302 using circular hollow sections, upper leg 301 is larger in diameter to allow bearings 307, 308 and bearing housing 303, 304 being installed between upper and lower parts 301/302. Lower part 302 extends suitable distance inside upper part 301 to provide adequate strength to the connection against forces acting on operating unit (500) and lower part of leg 302. The gap between lower 302 and upper 301 parts is sealed by shaft bearing 305 rendering the inside of upper part 301 waterproof.

Controlled rotation of lower part 302 and operational unit (500) is achieved by drive unit 581 installed inside the upper leg 301 above the top end of lower leg 302, driving wheels 583 via drive shafts 582. Drive wheels 583 engage top of lower leg 302 and rotate it in a controlled manner. It is envisaged that without drive unit 581 operational unit (500) and lower leg 302 would be free to rotate. See FIG. 9a.

In case mechanical drive train is to be installed lower shaft 630 and upper shaft 650 would be joined by shaft splice 640 to allow for method of assembly. Shafts 630 and 650 would be held by thrust bearing 631 and rotational bearings 652 and 634 held by bearing frames 632, 633 and 651, attached to inside of lower leg 302. See FIG. 9a.

A movable and/or extendable access deck 190 installed in a manner to avoid the path of the link element and operational unit. See FIGS. 2a, 2b, 2c.

The fixed part is designed to fit under the path of leg 301/302 and props 400 and allow extension to provide full width and side protection in the service position to nacelle and other components.

Potential utilisations of the invention are depicted on FIGS. 3a, 9a and 9b showing horizontal axis tidal turbine (HATT) as the operational unit with mechanical drive train from turbine to on-board plant (generator). FIG. 9c indicates the potential arrangement for HATT using hydraulic drive train instead of mechanical. Hydraulic pump 820 would be positioned above the top end of lower leg 302, connecting to transmission/gear box 810 via shafts 635, 636, shaft splice 640 and shaft 645. It is anticipated transmission/gear box 810 would increase the rotational speed adequate for hydraulic pump 820. This arrangement allows controlled or free turn around rotation of lower leg 302 and operational unit (500) relative to upper leg 301.

Axonometric views of potential HATT utilisation are shown on FIGS. 10a, 10b, 10c, end and side views of same on FIGS. 11a and 11b, sections on 12a, 12b, 12c.

Potential utilisation with modified vertical axis tidal turbine is indicated on FIGS. 13a, 13b and 13c.

Potential nacelle arrangement schematic with utilisation of low speed hydraulic pumps to create the hydraulic drive train is shown on FIG. 14a. This arrangement would require controlled rotation of lower leg 301 and nacelle (500) as the hydraulic pipes/hoses would not allow continuous rotation in one direction, rotation would have to be allowed in both directions with limited extent and controlled actively by drive unit.

An assembly and system described provides a number of benefits over other known assemblies.

The operating unit can be moved next to the main vessel and mostly above water, reducing beam and draft of vessel in the servicing stage.

Servicing the operational unit can be carried out from fixed or movable platforms attached to the main vessel.

The construction of the link element is simple, commercially available sections (large diameter pipes) can be considered.

Moving the operating unit from one position to the other is being accomplished by ropes and winches, avoiding the need for complex hydraulics.

The arrangement and formation of the hinge opens up the possibility of using mechanical drive train from/to the operating unit to/from the on-board plant (generator/engine) located in the main buoyancy vessel rather than in the nacelle.

The mechanical drive train can be adopted to suit the application of vertical axis turbines and make their construction simpler.

The arrangement suits the application of hydraulic drive train between the operating unit and on-board plant.

The use of mechanical or hydraulic drive trains with the generator being positioned in the main vessel offers the possibility of the blades and nacelle being fully above the water in the service position.

Adopting mechanical or hydraulic drive trains to place the main plant on board the main vessel simplifies design, construction operation and servicing.

The simpler structural arrangement allows for simpler control system, electronic, hydraulic and mechanical.

The above benefits aggregate to financial savings and reduced construction times.

REFERENCE NUMERALS FOR COMPONENT PARTS

1 Body of water
2 Surface of the body of water.
100 Floating vessel holding the operating unit
101 Floating vessel top deck 120 Pin Support Structure—holding the external end of the Main Hinge
121 Pin Support Structure—Columns connecting top to Floating Vessel
122 Pin Support Structure—Top
123 Pin Support Structure—Housing and mounting part for the Main Hinge
140 Leg Support Structure—holding and securing the Leg in service position
145 Leg Support Structure—Connection plate to secure Leg in service position
151 Prop—Alternative top connection—Hull side connection plate
152 Prop—Alternative top connection—Hull side connection plate—stiffener
153 Prop—Alternative top connection—Shear pin with threaded top
154 Prop—Alternative top connection—Hull side connection plate—Rope hole
161 Prop—Hull—Main connection—Hull side Plate
162 Prop—Hull—Main connection—Pin
163 Prop—Hull—Main connection—Guide plate
165 Prop—Hull—Main connection—Bracket for locking rod
166 Prop—Hull—Main connection—Locking rod
167 Prop—Hull—Main connection—Brackets for Locking rod
168 Prop—Hull—Main connection—Locking rod handle
171 Prop—Hull—Control rope roller—frame/holding plate
172 Prop—Hull—Control rope roller
181 Prop—Hull connection—Prop guide frame
182 Prop—Alternative top connection—Guide channel
190 Access platform/walkway attached to the Floating Vessel
191 Access platform/walkway—Upper level
195 Access ladder
200 Main Hinge—the structure enabling the rotation of the leg
212 Plant hinge—Connection plate
213 Plant hinge—Connection plate
214 Plant hinge—Bearing mounting plate
215 Plant hinge—Shaft bearing—Fixed
222 Main Hinge—Inside part—Hull connection plate
223 Main Hinge—Inside part—Hull connection plate
224 Main Hinge—Inside part—Bearing mounting plate
225 Main Hinge—Inside part—Shaft bearing—Fixed
232 Main hinge—Internal side—Hull connection plate
233 Main hinge—Internal side—Hull connection plate
234 Main hinge—Internal side—Bearing mounting plate
235 Main hinge—Internal bearing—Fixed part
236 Main hinge—Internal bearing—Rotating part
237 Main hinge—Hull side bearing—Fixed-Rotating contact face
238 Main hinge—Hull side bearing—Fixed-Shaft contact face
239 Main Hinge—Internal guide angle
245 Main hinge—External bearing—Fixed part
246 Main hinge—External bearing—Rotating part
247 Main hinge—External bearing—Fixed-Rotating contact face
248 Main hinge—External bearing—Fixed-Shaft contact face
249 Main Hinge—External guide angle
300 Leg—Pivoting member connected to the Vessel holding the operating unit
301 Leg—Top part attached to the Floating Vessel via the Main Hinge
302 Leg—Lower part connecting the Operating unit to the Top part
303 Leg—Lower part—Top bearing housing
304 Leg—Lower part—Lower bearing housing
305 Leg—Shaft seal
306 Leg—Lower part—Nacelle connection flange
307 Leg—Lower part—Top bearing
308 Leg—Lower part—Lower bearing
310 Leg—Main Hinge connection—Main plate
311 Leg—Main Hinge connection—Stiffener and guide plate
312 Leg—Main Hinge connection—Thrust bearing holding plate
320 Leg—Leg-Prop hinge
321 Leg—Prop lower connection plate
330 Leg—Prop Top connection—securing the prop in the service position
331 Leg—Prop upper connection plate
332 Leg—Prop connection pin
333 Leg—Prop connection pin—Spring thrust plate
334 Leg—Prop connection pin—Spring
335 Leg—Prop Upper rope roller holding frame
336 Leg—Prop Upper rope roller
337 Leg—Prop Upper rope winch holding frame
338 Leg—Prop Upper rope winch
339 Leg—Prop upper connection—pin hole
340 Leg—Prop upper connection—pin socket
341 Leg—Prop upper connection—bolt
345 Leg-Prop upper connection—Guide
351 Leg—Service position securing plate
352 Leg—Leg moving rope connection plate
353 Leg moving rope—Forward
354 Leg moving rope—Rear
355 Leg moving winch—Forward
356 Leg moving winch—Rear
400 Prop—members connecting the leg to the vessel in to operating position
402 Prop—Lower end—end plate
403 Prop—Upper end—end plate
421 Prop—Lower end—connection plate
422 Prop—Lower end—stiffener plate
431 Prop—Upper end—Main Hull connection plate
432 Prop—Upper end—Main connection plate—pin slot
433 Prop—Upper end—Leg and Rope connection plate
434 Prop—Upper end—Leg and Rope connection plate—Pin hole
435 Prop—Upper end—Leg and Rope connection plate—Rope hole
451 Prop—Alternative top connection plate
452 Prop—Alternative top connection plate—guide nib
453 Prop—Alternative top connection plate—pin hole
455 Prop—Alternative top connection—Locking device—Handle
456 Prop—Alternative top connection—Locking device—Frame
457 Prop—Alternative top connection—Locking device—Main plate
458 Prop—Alternative top connection—Locking device—Clamping cylinder
459 Prop—Alternative top connection—Locking device—Locking nut
471 Prop—Upper end—Top link/shackle
472 Prop—Upper end—Upper/Leg side control rope
473 Prop—Upper end—Lower link/shackle
474 Prop—Upper end—Lower/Hull side control rope 475 Hull side Prop control winch
500 Operating unit—plant operating under water and serviced above the water
501 Nacelle
502 Nacelle—Leg connection flange
503 Nacelle—Leg attaching "neck"
504 Nacelle—Main body
505 Nacelle—Bulk head and bearing mounting plate
506 Nacelle—Central mounting frame for shaft bearings
507 Nacelle—Central shaft bearings
510 Nacelle—Front rotating cover
511 Nacelle—Rear rotating cover
550 Turbine Blade—Horizontal axis turbine
551 Turbine blade—Mounting flanges
552 Turbine blade—Stub shaft
553 Turbine blade—Horizontal shaft
554 Turbine—Shaft seal and bearing
555 Turbine blade—Horizontal shaft—Pump shaft splice
556 Turbine axis—Bearing frame
557 Turbine axis—Bearing frame—Base
558 Turbine axis—Bearing
559 Nacelle—Hydraulic pump—Mounting podium
570 Vertical Axis Turbine
581 Nacelle rotator—drive unit
582 Nacelle rotator—drive shaft
583 Nacelle rotator—drive wheel
610 Drive train—Bevel Gear Wheel—Horizontal axis—Turbine
620 Drive train—Bevel Gear Wheel—Inclined axis—lower end
630 Drive train—Drive shaft—Lower end
631 Drive train—Lower shaft—Thrust bearing
632 Dive train—Lower shaft—Thrust bearing housing
633 Drive train—Lower shaft—Bearing frame
634 Drive train—Lower shaft—Bearing
635 Drive train—Lower shaft—Lower part
636 Drive train—Lower shaft—Upper part
637 Drive train—Lower shaft—Upper Bearing frame
638 Drive train—Lower shaft—Upper Bearing
640 Drive train—Drive shaft—splice
645 Drive train—Drive shaft—Top part
646 Drive train—Drive shaft—Top part—Shaft bearing frame
647 Drive train—Drive shaft—Top part—Shaft bearing
650 Drive train—Drive shaft—Top part
651 Drive train—Top shaft—Bearing Frame
652 Drive train—Top shaft—Bearing
653 Drive train—Top Thrust bearing on shaft
654 Drive train—Top Thrust bearing housing
660 Drive train—Bevel Gear Wheel—Inclined axis—top end
670 Drive train—Bevel Gear Wheel—Inward axis—top end
680 Drive train—Inward axis Drive shaft
681 Inward shaft—Thrust bearing—Top
682 Inward shaft—Thrust bearing—Lower
690 Drive train—Bevel Gear Wheel—Inward axis—lower end
700 Internal Plant on board the Floating Vessel
705 Internal Plant—Floor beams
706 Internal Plant—Mounting podium
710 Internal Plant—Main axis—Bevel gear wheel
810 Hydraulic drive train—Gear box/Transmission
811 Hydraulic drive train—Gear box/Transmission—Lower mounting frame
812 Hydraulic drive train—Gear box/Transmission—Packer
813 Hydraulic drive train—Gear box/Transmission—Upper mounting frame
820 Hydraulic drive train—Hydraulic pump
821 Hydraulic drive train—Hydraulic pump—Lower mounting plate
822 Hydraulic drive train—Hydraulic pump—Packer
823 Hydraulic drive train—Hydraulic pump—Upper mounting plate
830 Hydraulic drive train—Pipe
831 Hydraulic drive train—Pipe bracket

The invention claimed is:

1. A marine plant assembly comprising:
a buoyancy vessel;
a plant operating unit attached to the buoyancy vessel in such away that the operating unit is at least partially submerged during operation;
at least one link element providing an inclined hinged connection between the operating unit and the buoyancy vessel, thereby to allow movement of the operating unit from its submerged operating position to above the water level and adjacent the buoyancy vessel by said link element rotating about an inlined axis into a position substantially parallel to the buoyancy vessel;
wherein the hinge includes two pairs of cylindrical bearings aligned on a common inclined axis and being able to rotate relative to one another about the common axis, a first cylindrical bearing of each pair being attached secured to a connection plate which in turn is secured to the link member, and the second of each pair being indirectly secured to the buoyancy vessel;
wherein the second bearing of one pair is secured to a mounting plate which in turn is secured to the buoyancy vessel and the second bearing of the other pair is secured to a support structure which in turn is secured to the buoyancy vessel;
wherein each air of cylindrical bearings has a first central shaft extending therethrough, the shaft having a rotation transmitting device secured thereto to rotate the shaft about the common axis independent of the bearings.

2. A marine plant assembly according to claim 1, wherein the rotation transmitting device comprises a first bevel gear.

3. A marine plant assembly according to claim 2, wherein the link element further includes a second rotatable shaft extending to the operating unit and having a second bevelled gear engaging, in use with the first bevelled gear such that rotational force generated by the operating unit is transmitted through the second shaft to the first shaft via engagement of first and second bevelled gears and thereon to the buoyancy vessel for utilisation.

4. A marine plant assembly according to claim 1, wherein the rotation transmitting device comprises a sprocket.

5. A marine plant assembly according to claim 4, wherein rotational force generated by the operating unit is transmitted through a chain located within and through the link element to the sprocket and thereon to the buoyancy vessel for utilisation.

6. A marine plant assembly according to claim 1, wherein the link element is secured and retained in position by props attached to the link element and the buoyancy vessel.

7. A marine plant assembly according to claim 6, wherein props are attached via a hinge to the link element and are detachable from the buoyancy vessel so to allow the props to be positioned against the link element to allow rotation of the link element around the hinge.

8. A marine plant assembly according to claim 7, wherein the props are detachable from the link element.

9. A marine plant assembly according to claim 8, wherein movement of the link element is controllable using ropes attached to winches mounted on the buoyancy vessel.

\* \* \* \* \*

UNITED STATES PATENT AND TRADEMARK OFFICE
CERTIFICATE OF CORRECTION

PATENT NO. : 11,845,525 B2
APPLICATION NO. : 18/006172
DATED : December 19, 2023
INVENTOR(S) : Andras Vermes-Gabos It is certified that error appears in the above-identified patent and that said Letters Patent is hereby corrected as shown below:

In the Claims

Column 22, Line 16, in Claim 1, delete "away" and insert --a way--.

Column 22, Line 23, in Claim 1, delete "inlined" and insert --inclined--.

Column 22, Line 37, in Claim 1, delete "air" and insert --pair--.

Signed and Sealed this
Twenty-third Day of January, 2024

Katherine Kelly Vidal
*Director of the United States Patent and Trademark Office*